United States Patent
Kim et al.

(10) Patent No.: US 12,382,318 B2
(45) Date of Patent: Aug. 5, 2025

(54) METHOD AND APPARATUS FOR COLLECTING AND REPORTING CELL MEASUREMENT INFORMATION IN MOBILE COMMUNICATION SYSTEM

(71) Applicant: Samsung Electronics Co., Ltd., Gyeonggi-do (KR)

(72) Inventors: Sangbum Kim, Gyeonggi-do (KR); Soenghun Kim, Gyeonggi-do (KR); Beomsik Bae, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 325 days.

(21) Appl. No.: 17/273,222

(22) PCT Filed: Sep. 3, 2019

(86) PCT No.: PCT/KR2019/011289
§ 371 (c)(1),
(2) Date: Mar. 3, 2021

(87) PCT Pub. No.: WO2020/050575
PCT Pub. Date: Mar. 12, 2020

(65) Prior Publication Data
US 2021/0360449 A1    Nov. 18, 2021

(30) Foreign Application Priority Data

Sep. 5, 2018 (KR) .................. 10-2018-0106108

(51) Int. Cl.
*H04W 24/08* (2009.01)
*H04W 8/24* (2009.01)
(Continued)

(52) U.S. Cl.
CPC ............ *H04W 24/08* (2013.01); *H04W 8/24* (2013.01); *H04W 24/02* (2013.01); *H04W 24/10* (2013.01);
(Continued)

(58) Field of Classification Search
CPC ..... H04W 24/00; H04W 24/02; H04W 24/04; H04W 24/06; H04W 24/08; H04W 24/10
See application file for complete search history.

(56) References Cited

U.S. PATENT DOCUMENTS 10,887,919 B2    1/2021  Kim et al.
2012/0315890 A1* 12/2012  Suzuki ................. H04W 24/10
                                            455/422.1
(Continued)

FOREIGN PATENT DOCUMENTS

| EP | 2 360 962 | 8/2011 |
| WO | WO 2011/093653 | 8/2011 |
| WO | WO 2012/141483 | 10/2012 |

OTHER PUBLICATIONS

3GPP, 3rd Generation Partnership Project; Technical Specification Group Radio Access Network; UTRAN Iu Interface Radio Access Network Application Part (RANAP) Signalling (Release 15), 3GPP TS 25.413 V15.0.0, Jun. 2018, 455 pages.

(Continued)

*Primary Examiner* — Gary Mui
*Assistant Examiner* — Yewon Kim
(74) *Attorney, Agent, or Firm* — The Farrell Law Firm, P.C.

(57) ABSTRACT

The disclosure relates to a method and apparatus for collecting and reporting cell measurement information in a mobile communication system. According to an embodiment, the method, performed by a user equipment (UE), of reporting cell measurement information in a mobile communication system includes: transmitting UE capability information about whether to support a minimization of drive test (MDT) operation to a first base station of a first mobile communication system; receiving MDT configuration information from at least one base station of the first base station or a second base station of a second mobile (Continued)

communication system which is different from the first mobile communication system; collecting MDT measurement information based on the MDT configuration information; and transmitting the MDT measurement information to the at least one base station of the first base station or the second base station, wherein the first base station and the second base station support dual connectivity.

10 Claims, 23 Drawing Sheets

(51) Int. Cl.
  *H04W 24/02* (2009.01)
  *H04W 24/10* (2009.01)
  *H04W 36/00* (2009.01)
  *H04W 76/15* (2018.01)

(52) U.S. Cl.
  CPC ...... *H04W 76/15* (2018.02); *H04W 36/00698* (2023.05)

(56) References Cited

U.S. PATENT DOCUMENTS

| | | | | |
|---|---|---|---|---|
| 2013/0070632 A1* | 3/2013 | Jung | ............ | H04W 24/10 370/252 |
| 2013/0196650 A1* | 8/2013 | Futaki | ............ | H04W 24/10 455/424 |
| 2013/0203420 A1* | 8/2013 | Hapsari | ............ | H04W 24/10 455/437 |
| 2015/0131578 A1 | 5/2015 | Baek et al. | | |
| 2016/0029208 A1 | 1/2016 | Kim et al. | | |
| 2017/0208491 A1 | 7/2017 | Xu et al. | | |
| 2017/0318505 A1 | 11/2017 | Park et al. | | |
| 2018/0242181 A1 | 8/2018 | Tsutsui | | |
| 2019/0306740 A1* | 10/2019 | Kim | ............ | H04W 24/10 |

OTHER PUBLICATIONS

Samsung, "On Supporting MDT for RRC_Idle and RRC_Inactive", R2-1905085, 3GPP TSG-RAN WG2#105bis, Apr. 8-12, 2019, 4 pages.

European Search Report dated Dec. 1, 2021 issued in counterpart application No. 19857222.4-1212, 13 pages.

3rd Generation Partnership Project; Technical Specification Group Radio Access Network; Universal Terrestrial Radio Access (UTRA) and Evolved Universal Terrestrial Radio Access (E-UTRA); Radio Measurement Collection for Minimization of Drive Tests (MDT); Overall Description; Stage 2 (Release 15), 3GPP TS 37.320 V15.0.0, Jun. 2018, 27 pages.

International Search Report dated Dec. 12, 2019 issued in counterpart application No. PCT/KR2019/011289, 19 pages.

Korean Office Action dated Aug. 23, 2023 issued in counterpart application No. 10-2018-0106108, 6 pages.

ETSI TS 138 331 v15.2.1, 5G; Nr; Radio Resource Control (RRC); Protocol Specification (3GPP TS 38.331 Version 15.2.1 Release 15), Jun. 2018, 300 pages.

Korean Notice of Allowance dated Feb. 16, 2024 issued in counterpart application No. 10-2018-0106108, 11 pages.

European Search Report dated Feb. 7, 2024 Issued in counterpart application No. 19857222.4-1216, 7 pages.

* cited by examiner

METHOD AND APPARATUS FOR COLLECTING AND REPORTING CELL MEASUREMENT INFORMATION IN MOBILE COMMUNICATION SYSTEM

PRIORITY

This application is a National Phase Entry of PCT International Application No. PCT/KR2019/011289, which was filed on Sep. 3, 2019, and claims priority to Korean Patent Application No. 10-2018-0106108, which was filed on Sep. 5, 2018, the entire content of each of which is incorporated herein by reference.

TECHNICAL FIELD

The disclosure relates to a method and apparatus for collecting and reporting cell measurement information in a mobile communication system.

BACKGROUND ART

To meet the increasing demand with respect to wireless data traffic after the commercialization of $4^{th}$ Generation (4G) communication systems, efforts to develop an enhanced $5^{th}$ Generation (5G) communication system or a pre-5G communication system are continuing. For this reason, a 5G communication system or pre-5G communication system is called a Beyond 4G Network communication system or a post long term evolution (LTE) system. The 5G communication system defined in the $3^{rd}$ Generation Partnership Project (3GPP) is called a New Radio (NR) system. To achieve a high data transmission rate, the implementation of 5G communication systems in an ultra-high-frequency (mmWave) band (for example, a 60 GHz band) is being considered. To reduce path loss of radio waves and increase a transfer distance of radio waves in an ultra-high-frequency band, in 5G communication systems, technologies for beamforming, massive multiple input multiple output (massive MIMO), full dimensional MIMO (FD-MIMO), array antenna, analog beam-forming, and large-scale antennas have been discussed, and the technologies have been applied to the NR system. Also, to improve the network of the system, various technologies, such as evolved small cell, advanced small cell, cloud radio access network (cloud RAN), ultra-dense networks, device to device (D2D) communication, wireless backhaul, moving networks, cooperative communication, coordinated multi-points (CoMP), and interference cancellation, have been developed for 5G communication systems. In addition, other technologies, such as Hybrid frequency-shift keying (FSK) and quadrature amplitude modulation (QAM) Modulation (FQAM) and sliding window superposition coding (SWSC) based on advanced coding modulation (ACM), and non-orthogonal multiple access (NOMA), sparse code multiple access (SCMA), and filter bank multi carrier (FBMC) being advanced access technology, have been developed for 5G communication systems.

Meanwhile, the Internet is evolving from a human-centered network in which humans generate and consume information to an Internet of Things (IoT) network in which distributed components such as objects transmit and receive information and process it. Internet of Everything (IoE) technology resulting from combining IoT technology with big data processing technology, etc. through a connection to a cloud server or the like is on the rise. To implement the IoT, various technological elements, such as sensing technology, wired/wireless communication, network infrastructure, service interface technology, and security technology, are required. Recently, technologies including a sensor network, machine to machine (M2M) communication, and machine type communication (MTC) for connections between objects have been studied. In an IoT environment, an intelligent Internet technology (IT) service is provided to collect and analyze data generated by connected objects to create new values for human life. The IoT may be applied to various fields, such as smart homes, smart buildings, smart cities, smart cars/connected cars, smart grids, health care, smart appliances, and advanced medical services, through convergence and combination between existing information technology (IT) and various industries.

Accordingly, various attempts to apply a 5G communication system to an IoT network are being made. For example, 5G communication, such as sensor networks, M2M communication, and MTC, is implemented by technologies, such as beam forming, MIMO, and array antenna. Applying a cloud radio access network (cloud RAN) as big data processing technology described above also is an example of the convergence of 5G technology and IoT technology.

As various services are provided with the development of the mobile communication system in addition to the above-described technologies, methods for effectively providing the services are required.

DESCRIPTION OF EMBODIMENTS

Technical Problem

The disclosed embodiments provide an apparatus and method for effectively providing a service in a mobile communication system.

Solution to Problem

According to an embodiment, a method, performed by a user equipment (UE), of reporting cell measurement information in a mobile communication system includes: transmitting UE capability information about whether to support a minimization of drive test (MDT) operation to a first base station of a first mobile communication system; receiving MDT configuration information from at least one base station of the first base station or a second base station of a second mobile communication system which is different from the first mobile communication system; collecting MDT measurement information based on the MDT configuration information; and transmitting the MDT measurement information to the at least one base station of the first base station or the second base station, wherein the first base station and the second base station support dual connectivity.

According to an embodiment, a method, performed by a first base station, of obtaining cell measurement information in a first mobile communication system includes: receiving user equipment (UE) capability information about whether to support a minimization of drive test (MDT) operation from a UE; transmitting the UE capability information to a second base station of a second mobile communication system which is different from the first mobile communication system; coordinating MDT configuration information with the second base station; transmitting the coordinated MDT configuration information to the UE; and receiving MDT measurement information measured based on the coordinated MDT configuration information from the UE, wherein the first base station and the second base station support dual connectivity.

According to an embodiment, a method, performed by a second base station, of obtaining cell measurement information in a second mobile communication system includes: receiving user equipment (UE) capability information about whether to support a minimization of drive test (MDT) operation from a first base station of a first mobile communication system which is different from the second mobile communication system; coordinating MDT configuration information with the first base station; transmitting the coordinated MDT configuration information to a UE that has transmitted the UE capability information; and receiving MDT measurement information measured based on the coordinated MDT configuration information from the UE, wherein the first base station and the second base station support dual connectivity.

According to an embodiment, a user equipment (UE) for reporting cell measurement information in a mobile communication system includes: a transceiver; and a controller configured to transmit UE capability information about whether to support a minimization of drive test (MDT) operation to a first base station of a first mobile communication system, receive MDT configuration information from at least one base station of the first base station or a second base station of a second mobile communication system which is different from the first mobile communication system, collect MDT measurement information based on the MDT configuration information, and transmit the MDT measurement information to the at least one base station of the first base station or the second base station, wherein the first base station and the second base station support dual connectivity.

Advantageous Effects of Disclosure

According to the disclosed embodiments, services may be effectively provided in a mobile communication system.

BEST MODE

Figure 1:
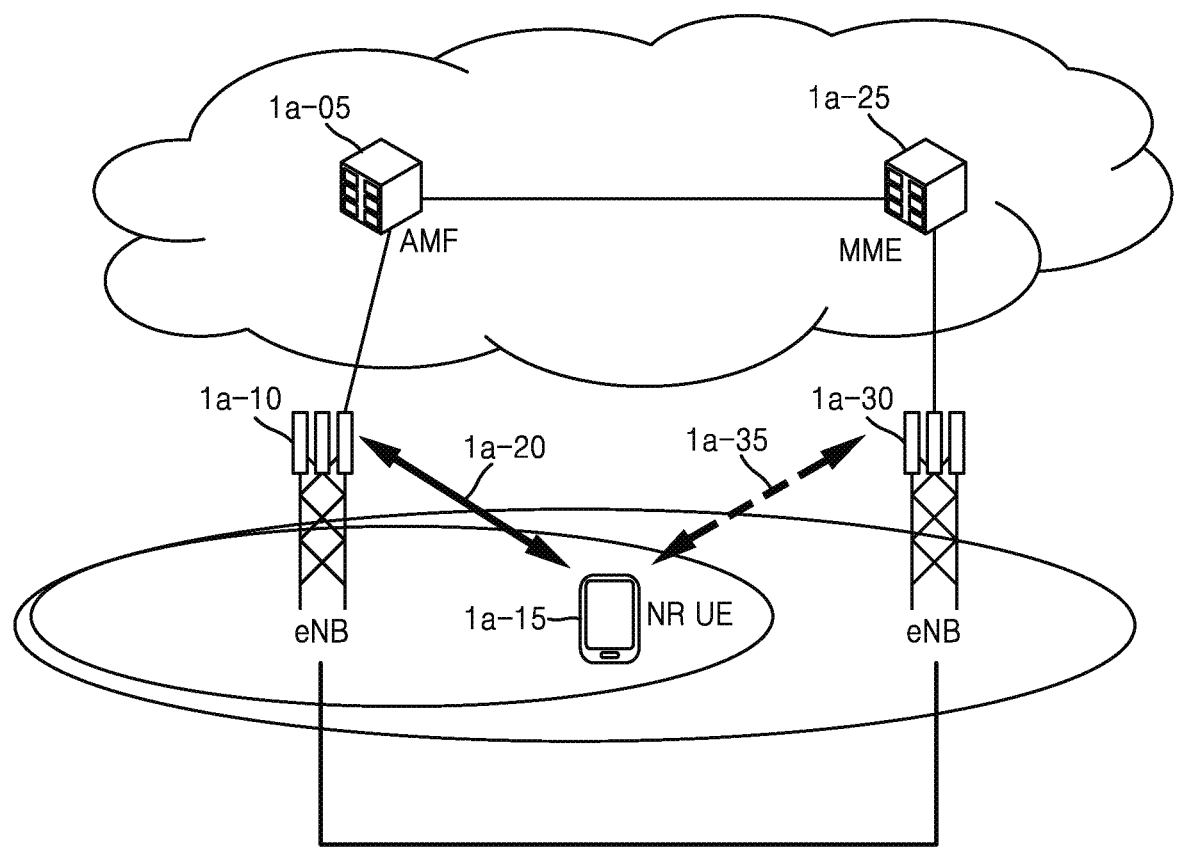
FIG. 1 illustrates a structure of a next-generation mobile communication system to which an embodiment is applied.

According to an embodiment, a method, performed by a user equipment (UE), of reporting cell measurement information in a mobile communication system, includes: transmitting UE capability information about whether to support a minimization of drive test (MDT) operation to a first base station of a first mobile communication system; receiving MDT configuration information from at least one base station of the first base station or a second base station of a second mobile communication system which is different from the first mobile communication system; collecting MDT measurement information based on the MDT configuration information; and transmitting the MDT measurement information to the at least one base station of the first base station or the second base station, wherein the first base station and the second base station support dual connectivity.

According to an embodiment, the UE may operate in a radio resource control (RRC) connected mode with the at least one base station of the first base station or the second base station.

According to an embodiment, the method may further include: receiving, when receiving the MDT configuration information from the first base station, the MDT configuration information through a radio resource control (RRC)

message transmitted through a signaling radio bearer 1 (SRB1), and receiving, when receiving the MDT configuration information from the second base station, the MDT configuration information through a radio resource control (RRC) message transmitted through a signaling radio bearer 3 (SRB3).

According to an embodiment, wherein the collecting of the MDT measurement information based on the MDT configuration information may include collecting first MDT measurement information based on MDT configuration information received from the first base station, and collecting second MDT measurement information based on MDT configuration information received from the second base station, and the transmitting of the MDT measurement information may include transmitting the first MDT measurement information and the second MDT measurement information, respectively, to the first base station and the second base station that respectively have transmitted the MDT configuration information, or transmitting the first MDT measurement information and the second MDT measurement information to the first base station or the second base station.

According to an embodiment, a method, performed by a first base station, of obtaining cell measurement information in a first mobile communication system, includes: receiving user equipment (UE) capability information about whether to support a minimization of drive test (MDT) operation from a UE; transmitting the UE capability information to a second base station of a second mobile communication system which is different from the first mobile communication system; coordinating MDT configuration information with the second base station; transmitting the coordinated MDT configuration information to the UE; and receiving MDT measurement information measured based on the coordinated MDT configuration information from the UE, wherein the first base station and the second base station support dual connectivity.

According to an embodiment, the coordinating of the MDT configuration information with the second base station may include: generating first MDT configuration information; and transmitting the first MDT configuration information to the second base station and receiving second MDT configuration information from the second base station, or receiving the second MDT configuration information from the second base station.

According to an embodiment, the coordinating of the MDT configuration information with the second base station may further include opposing, rejecting, or requesting change of the second MDT configuration information to the second base station.

According to an embodiment, the coordinating of the MDT configuration information with the second base station may include not coordinating the MDT configuration information with the second base station.

According to an embodiment, the method may further include transmitting MDT data to a trace collection entity (TCE) server based on at least one of the MDT measurement information received from the UE or MDT-related information obtained by the first base station.

According to an embodiment, the transmitting of the MDT data to the TCE server may include: receiving the MDT data from the second base station; and transmitting the MDT data received from the second base station to the TCE server.

According to an embodiment, a method, performed by a second base station, of obtaining cell measurement information in a second mobile communication system, includes: receiving user equipment (UE) capability information about whether to support a minimization of drive test (MDT) operation from a first base station of a first mobile communication system which is different from the second mobile communication system; coordinating MDT configuration information with the first base station; transmitting the coordinated MDT configuration information to a UE that has transmitted the UE capability information; and receiving MDT measurement information measured based on the coordinated MDT configuration information from the UE, wherein the first base station and the second base station support dual connectivity.

According to an embodiment, the coordinating of the MDT configuration information with the second base station may include: generating first MDT configuration information; and transmitting the first MDT configuration information to the second base station and receiving second MDT configuration information from the second base station, or receiving the second MDT configuration information from the second base station.

According to an embodiment, the coordinating of the MDT configuration information with the second base station may include not coordinating the MDT configuration information with the second base station.

According to an embodiment, the method may further include transmitting MDT data to a trace collection entity (TCE) server or the first base station, based on at least one of the MDT measurement information received from the UE or MDT-related information obtained by the second base station.

According to an embodiment, a user equipment (UE) of reporting cell measurement information in a mobile communication system, includes: a transceiver; and a controller configured to transmit UE capability information about whether to support a minimization of drive test (MDT) operation to a first base station of a first mobile communication system, receive MDT configuration information from at least one base station of the first base station or a second base station of a second mobile communication system which is different from the first mobile communication system, collect MDT measurement information based on the MDT configuration information, and transmit the MDT measurement information to the at least one base station of the first base station or the second base station, wherein the first base station and the second base station support dual connectivity.

MODE OF DISCLOSURE

Hereinafter, embodiments of the disclosure will be described in detail with reference to the accompanying drawings.

When the embodiments are described, descriptions about technical content well known in the technical field to which the disclosure belongs and not directly related to the disclosure will be omitted. The reason for this is to more clearly convey, without obscuring, the gist of the disclosure by omitting unnecessary descriptions.

For the same reason, some components of the accompanying drawings may be exaggeratedly shown, omitted, or schematically shown. Also, the sizes of the components do not completely reflect their actual sizes. The same or corresponding components in the drawings are assigned like reference numerals.

Advantages and features of the disclosure and a method for achieving them will be clear with reference to the accompanying drawings, in which embodiments are shown.

The disclosure may, however, be embodied in many different forms and should not be construed as being limited to the embodiments set forth herein; rather, these embodiments are provided so that this disclosure will be thorough and complete, and will fully convey the concept of the disclosure to those of ordinary skill in the art, and the disclosure is only defined by the scope of the claims. Like reference numerals denote like elements throughout the specification.

It will be appreciated that the combinations of blocks and flowchart illustrations in the process flow diagrams may be performed by computer program instructions. These computer program instructions may be loaded into a processor of a general purpose computer, a special purpose computer, or other programmable data processing equipment, so that those instructions, which are executed through a processor of a computer or other programmable data processing equipment, create means for performing functions described in the flowchart block(s). These computer program instructions may also be stored in a computer usable or computer readable memory capable of directing a computer or other programmable data processing equipment to implement the functions in a particular manner so that the instructions stored in the computer usable or computer readable memory are also capable of producing manufacturing items containing instruction means for performing the functions described in the flowchart block(s). Computer program instructions may also be installed on a computer or other programmable data processing equipment so that a series of operating steps may be performed on a computer or other programmable data processing equipment to create a computer-executable process. Therefore, it is also possible for the instructions to operate the computer or other programmable data processing equipment to provide steps for executing the functions described in the flowchart block(s).

In addition, each block may represent a module, segment, or portion of code that includes one or more executable instructions for executing specified logical function(s). It should also be noted that in some alternative implementations, the functions mentioned in the blocks may occur out of order. For example, two blocks shown in succession may actually be executed substantially concurrently, or the blocks may sometimes be performed in reverse order according to the corresponding function.

As used herein, the terms 'portion', 'module', or 'unit' refers to a unit that can perform at least one function or operation, and may be implemented as a software or hardware component such as a Field Programmable Gate Array (FPGA) or an Application Specific Integrated Circuit (ASIC). However, the term 'portion', 'module' or 'unit' is not limited to software or hardware. The 'portion', 'module', or 'unit' may be configured in an addressable storage medium, or may be configured to run on at least one processor. Therefore, according to an embodiment of the disclosure, the 'portion', 'module', or 'unit' includes: components such as software components, object-oriented software components, class components, and task components; processes, functions, attributes, procedures, sub-routines, segments of program codes, drivers, firmware, microcodes, circuits, data, databases, data structures, tables, arrays, and variables. Functions provided in the components and 'portions', 'modules' or 'units' may be combined into a smaller number of components and 'portions', 'modules' and 'units', or sub-divided into additional components and 'portions', 'modules' or 'units'. Also, the components and 'portions', 'modules' or 'units' may be configured to run on one or more Central Processing Units (CPUs) in a device or a security multimedia card. Also, in the embodiments, the 'portion', 'module' or 'unit' may include one or more processors.

As used herein, the term indicating a connection node, the term indicating network entities, the term indicating messages, the term indicating an interface between network entities, the term indicating various identification information, etc. are examples for convenience of description. Accordingly, the disclosure is not limited to the terms which will be described later, and other terms having equivalent technical meanings may be used.

Hereinafter, for convenience of description, terms and names defined in specifications for $5^{th}$ Generation (5G), new radio (NR), or long term evolution (LTE) systems may be used in the disclosure. However, the disclosure is not limited to these terms and names, and may also be applied to systems based on other specifications.

The following detailed descriptions about the embodiments of the disclosure are mainly targeted to communication specifications defined by the 3rd Generation Partnership Project (3GPP). However, the main gist of the disclosure may be applied to other communication systems having similar technical backgrounds through slight modifications within a range that does not greatly deviate from the scope of the disclosure, under a determination of a person having a skilled technical knowledge.

FIG. 1 illustrates a structure of a next-generation mobile communication system to which an embodiment is applied.

Referring to FIG. 1, a radio access network of a next-generation mobile communication system (5G or NR system) may be configured with a next-generation base station (new radio node B (NR NB), NR gNB or gNB) 1a-10 and an access and mobility management function (AMF) 1a-05 or a new radio core network (NR CN) (or next-generation core network (NG CN)). A user equipment (UE) (or referred to as a new radio user equipment (NR UE) or a terminal) 1a-15 may be connected to an external network through the NR gNB 1a-10 and the AMF 1a-05.

In FIG. 1, the NR gNB 1a-10 may correspond to an evolved node B (eNB) of a LTE system. The NR gNB 1a-10 may be connected to the NR UE 1a-15 through a wireless channel, and provide a superior service than a legacy node B. In the next-generation mobile communication system, because all user traffics are serviced through a shared channel, a device for performing scheduling by collecting status information of UEs, such as buffer statuses of UEs, available transmission power states of UEs, channel states of UEs, etc., is needed. The NR gNB 1a-10 may function as such a device. An NR gNB 1a-10 may generally control a plurality of cells, and may be configured with a central unit (CU) for managing control and signaling and a distributed unit (DU) being in charge of transmission/reception of signals. To implement ultra high-speed data transmission compared to LTE systems, the next-generation mobile communication system (5G or NR system) may use a legacy maximum bandwidth or more, and combine orthogonal frequency division multiplexing (OFDM) as air interface technology with beam-forming technology. Also, the next-generation mobile communication system may apply adaptive modulation & coding (hereinafter, referred to as AMC) of determining a modulation scheme and a channel coding rate according to a channel state of a UE. The AMF 1a-05 may perform functions, such as mobility support, bearer setup, quality of service (QoS) setup, etc. The AMF 1a-05 may be in charge of various control functions, as well as a mobility management function for UEs, and may be connected to a plurality of base stations. Also, the next-generation mobile communication system (5G or NR system) may interwork with LTE systems, and the AMF 1a-05 may be connected to a mobility management entity (MME) 1a-25 through a network interface. The MME 1a-25 may be connected to an eNB 1a-30 which is a legacy base station. A UE supporting EUTRA (LTE)-NR dual connectivity (EN-DC) may be connected to the eNB 1a-30, as well as the gNB 1a-10, to transmit and receive data (1a-35). In the EN-DC, only LTE systems may be connected to a core network (MME) 1a-25 and the LTE systems may be connected to a NR base station.

Figure 2:
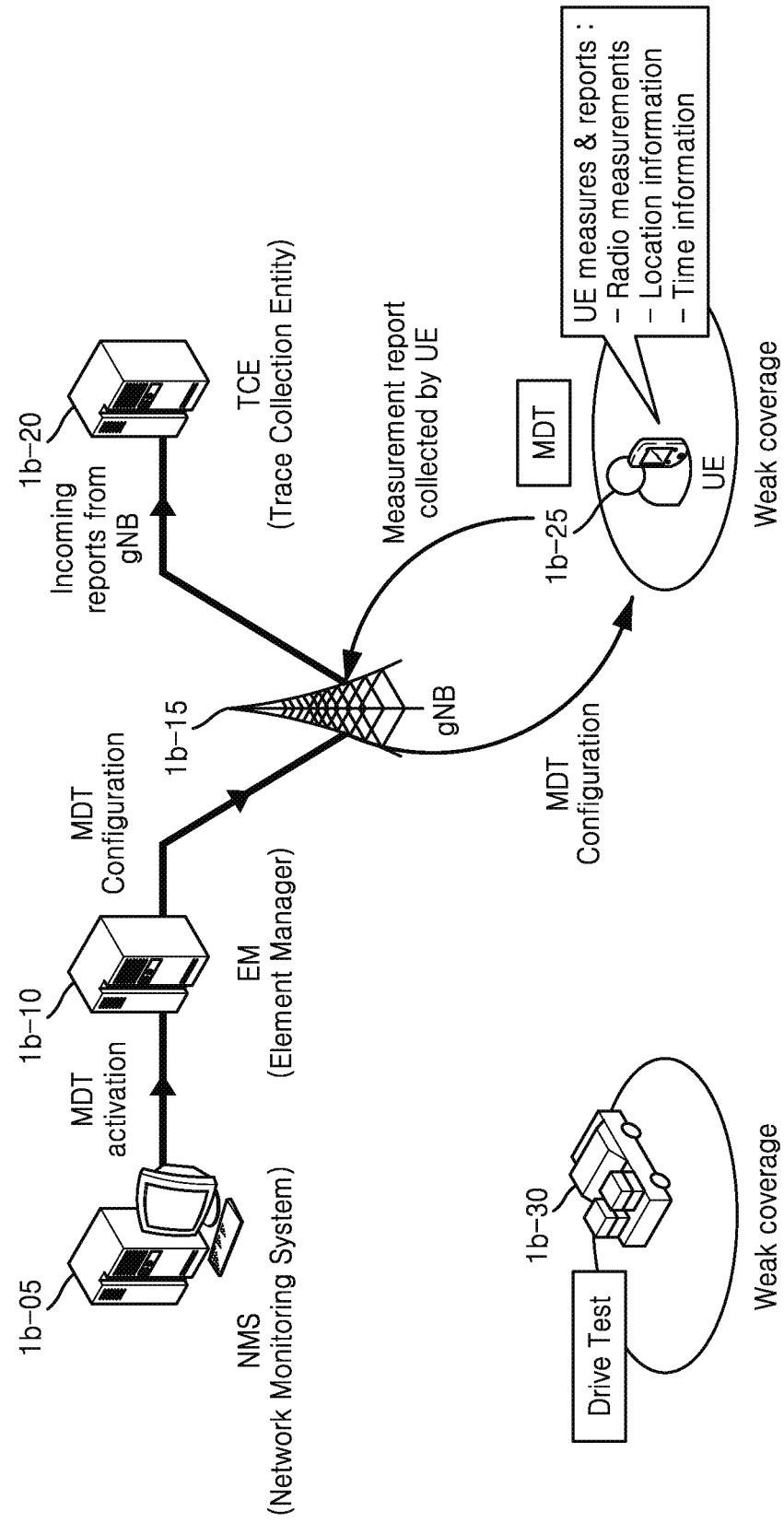
FIG. 2 is a diagram for describing a procedure of collecting and reporting cell measurement information, according to an embodiment.

FIG. 2 is a diagram for describing a procedure of collecting and reporting cell measurement information according to an embodiment.

Upon network establishment or network optimization, a mobile network operator performs a procedure of measuring signal intensity in a general expected service area and arranging or rearranging base stations in the service area based on the measured signal intensity. In the procedure, the mobile network operator loads signal measurement equipment in a vehicle and moves to collect cell measurement information in the service area. The procedure is called a drive test. The drive test requires a long time and a lot of expense.

To support operations, such as cell reselection or handover, addition of a serving cell, etc., upon movement between cells, UEs may have a function for measuring signals received from a base station. Accordingly, instead of the drive test, cell measurement information may be collected by using UEs existing in a service area. The procedure is called a minimization of drive test. The mobile network operator may set a MDT operation for specific UEs through several components of a network, and the UEs for which the MDT operation has been set and is in a connected mode RRC_Connected, an idle mode RRC_Idle, or an inactive mode RRC_Inactive may collect and store signal intensity information from a serving cell and neighboring cells. Also, the UEs for which the MDT operation has been set may store various information, such as position information, time information, and signal quality information, together with the signal intensity information. The stored information may be reported to the network when the corresponding UEs are in the connected mode RRC_Connected, and, in this case, the stored information may be transferred to a specific server. MDT measurement information may include information collected by a UE and then reported to a base station and information measured by a base station, as follows.

M1: received signal reference power (RSRP) and reference signal reference quality (RSRQ) measurement by UE M2: power headroom measurement by UE M3: received interference power measurement by eNB (or gNB)

M4: data volume measurement separately for downlink (DL) and uplink (UL), per quality control information (QCI) per UE, by eNB (or gNB)

M5: scheduled IP throughput for MDT measurement separately for DL and UL, per RAB per UE and per UE for the DL, per UE for the UL, by eNB (or gNB)

M6: Packet Delay measurement, separately for DL and UL, per QCI per UE, see UL packet data convergence protocol (PDCP) delay, by the UE, and packet delay in the DL per QCI, by the eNB (or gNB)

M7: packet loss rate measurement, separately for DL and UL per QCI per UE, by the eNB (or gNB)

Information collected by a UE may be reported to a base station through a MDT operation, and the MDT operation may be classified into immediate MDT and logged MDT.

The immediate MDT may be an operation of immediately reporting collected information to a network. Because the immediate MDT is to immediately report collected information, a UE being in a connected mode may perform the immediate MDT. Generally, the immediate MDT may reuse a radio resource measurement (RRM) procedure for supporting operations, such as handover, addition of a serving cell, etc., and position information, time information, etc. may be additionally reported.

The logged MDT may be an operation of storing collected information, instead of immediately reporting the collected information to a network, and reporting, after a UE transits to a connected mode, the stored information to the network. Generally, a UE being in an idle mode in which stored information cannot be immediately reported to a network may perform the logged MDT. According to an embodiment, a UE belonging to a next-generation mobile communication system and being in an inactive mode may perform the logged MDT. When a specific UE is in a connected mode, a network may provide the UE with configuration information for performing a logged MDT operation, and, the UE which has received the configuration information may collect and store the configuration information after transiting to an idle mode or an inactive mode.

TABLE 1

| | RRC state |
|---|---|
| Immediate MDT | RRC_Connected |
| Logged MDT | RRC_Idle, RRC_Inactive |

In the disclosure, a MDT operation in the EN-DC structure is described, and a method of measuring a scheduled IP throughput, a data volume, and a DL packet delay in the EN-DC structure or CU-DU structure is described. In the disclosure, the following descriptions are based on the EN-DC structure, however, the following descriptions may also be applied to a general dual connectivity structure (for example, a Multi-RAT (MR)-DC structure) configured with other systems. EN-DC may be an example of MR-DC.

Figure 3:
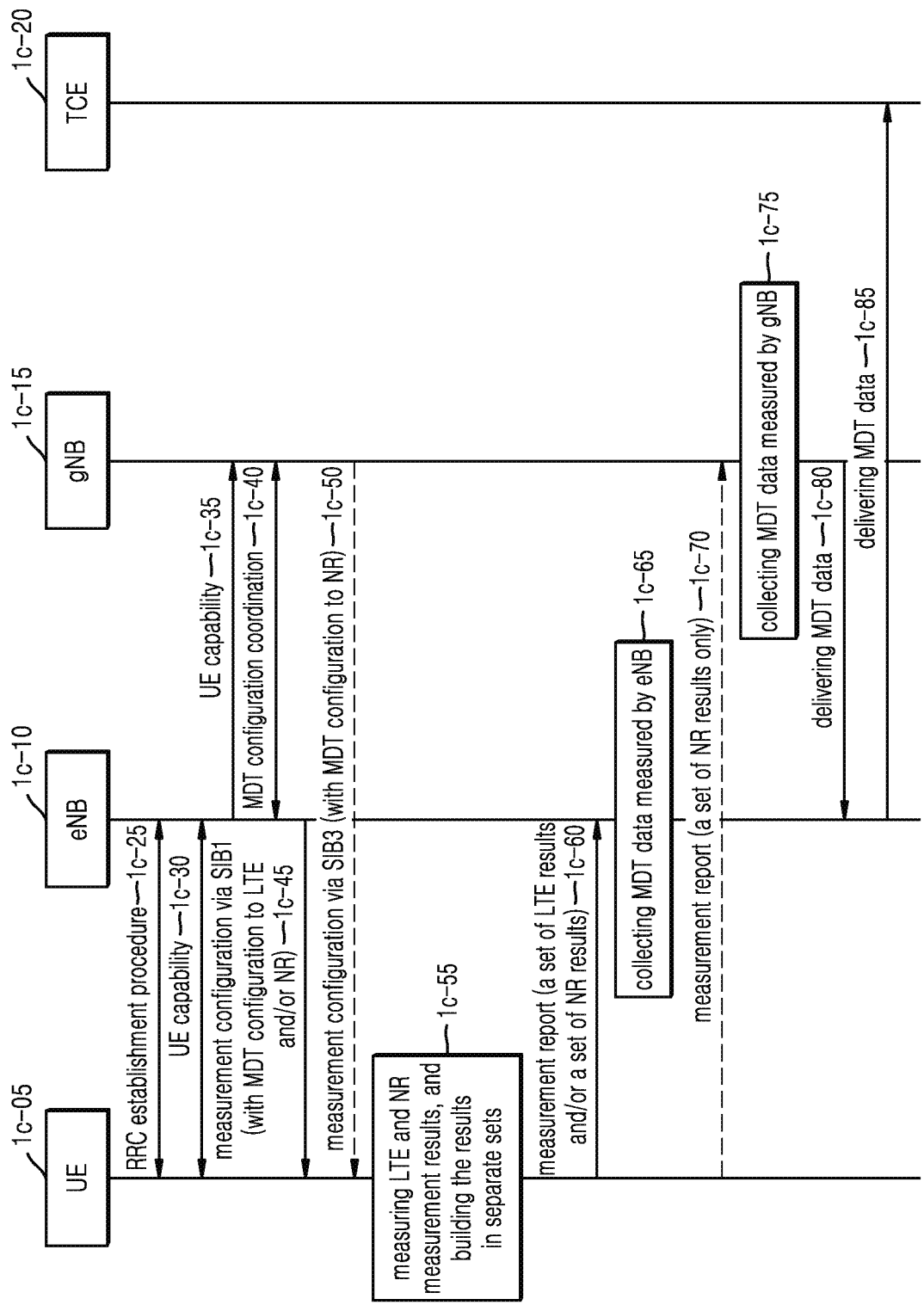
FIG. 3 is a diagram for describing a minimization of drive test (MDT) operation according to an embodiment.

FIG. 3 is a diagram for describing a MDT operation according to an embodiment.

Referring to FIG. 3, a UE 1c-05 may transit to a connected mode through a radio resource control (RRC) establishment procedure with a LTE base station (eNB) 1c-10, in operation 1c-25. Thereafter, the UE 1c-05 may be additionally connected to a NR base station (gNB) 1c-15 to perform data communication, as necessary. The NR base station 1c-15 may be connected to the LTE base station 1c-10 to transmit and receive required configuration information and general data to provide the UE 1c-05 with a service. According to an embodiment, the LTE base station 1c-10 may be connected to a MME which is a core network, whereas the NR base station 1c-15 may need not to be connected to an AMF. The structure is called EN-DC. The UE 1c-05 may report UE capability information to one of the LTE base station 1c-10 and the NR base station 1c-15, in operation 1c-30. In FIG. 3, a procedure in which the UE 1c-05 reports UE capability information to the LTE base station 1c-10 is shown as an example, however, the UE 1c-05 may report UE capability information to the NR base station 1c-15. According to an embodiment, the UE capability information may indicate whether to support a MDT operation. Particularly, the UE capability information may indicate whether to support a MDT operation in a MR-DC structure such as EN-DU. The LTE base station 1c-10 which has received the UE capability information may forward the UE capability information to another base station (in FIG. 3, the NR base station 1c-15) existing in the EN-DC structure, in operation 1c-35.

According to an embodiment, both the LTE base station 1c-10 and the NR base station 1c-15 may set a connected mode MDT operation (immediate MDT) for the UE 1c-05. Also, the LTE base station 1c-10 and the NR base station 1c-15 may report MDT configuration information to each other and coordinate the MDT configuration information, in operation 1c-40. The coordination may be performed as follows.

Option 1: the LTE base station 1c-10 may report MDT configuration information triggered by itself to the NR base station 1c-15, and the NR base station 1c-15 may oppose, reject, or request change of the MDT configuration information. The NR base station 1c-15 may report MDT configuration information triggered by itself to the LTE base station 1c-10, and the LTE base station 1c-10 may oppose, reject, or request change of the MDT configuration information.

Option 2: the LTE base station 1c-10 may not report MDT configuration information triggered by itself to the NR base station 1c-15. However, the NR base station 1c-15 may report MDT configuration information triggered by itself to the LTE base station 1c-10, and the LTE base station 1c-10 may oppose, reject, or request change of the MDT configuration information.

Option 3: the LTE base station 1c-10 and NR base station 1c-15 may need not to report MDT configuration information triggered by themselves to the other base station, and may set a MDT operation independently.

Option 4: although the LTE base station 1c-10 and NR base station 1c-15 report MDT configuration information triggered by themselves to the other base station, the LTE base station 1c-10 and NR base station 1c-15 may set a MDT operation independently. That is, the other base station may not oppose, reject, or request change of the MDT configuration information.

Separately from the coordination described above, there may be a case in which MDT operations cannot be simultaneously performed due to limited UE capability. Accordingly, to prevent MDT operations from being simultaneously performed, Option 1 or Option 2 may need to be applied.

Through the coordination, the LTE base station 1c-10 or the NR base station 1c-15 may set a MDT operation for the UE 1c-05. The LTE base station 1c-10 may provide MDT configuration information to the UE 1c-05 through a predefined RRC message, in operation 1c-45. The predefined RRC message may belong to SRB1. The NR base station 1c-15 may provide MDT configuration information to the UE 1c-05 through a predefined RRC message belonging to SRB3, in operation 1c-50. The UE 1c-05 may perform a MDT operation according to the MDT configuration information.

According to an embodiment, the LTE base station 1c-10 and NR base station 1c-15 may simultaneously provide independent MDT configuration information, respectively, to the UE 1c-05. In this case, the UE 1c-05 may perform two kinds of MDT operations simultaneously according to the MDT configuration information, in operation 1c-55. The UE 1c-05 may collect a frequency indicated by each piece of configuration information, and signal intensities and qualities measured from cells, and configure information that is to be reported to the LTE base station 1c-10 and the NR base station 1c-15. The UE 1c-05 may report a measurement result to the LTE base station 1c-10, in operation 1c-60. The LTE base station 1c-10 may collect measurement information related to the UE 1c-05, in operation 1c-65. The UE 1c-05 may report the measurement result to the NR base station 1c-15, in operation 1c-70. The NR base station 1c-15 may collect measurement information related to the UE 1c-05, in operation 1c-75, and forward the collected measurement information to the LTE base station 1c-10, in operation 1c-80. The LTE base station 1c-10 may transmit, in addition to information collected by itself, the information forwarded from the NR base station 1c-15 to a trace collection entity (TCE) server 1c-20, in operation 1c-85.

MDT measurement information may include information collected by and reported from UEs and information obtained by base stations. A scheduled IP throughput, a data volume, a DL packet delay, etc. may belong to information obtained by base stations. The information may be obtained as a result of involvement of various layers, such as PDCP, RLC, MAC, etc. In the EN-DC, a PDCP layer, a radio link control (RLC) layer, and a medium access control (MAC) layer may exist in different base stations. Accordingly, to obtain MDC measurement information, two base stations need to share information that they need.

Figure 4:
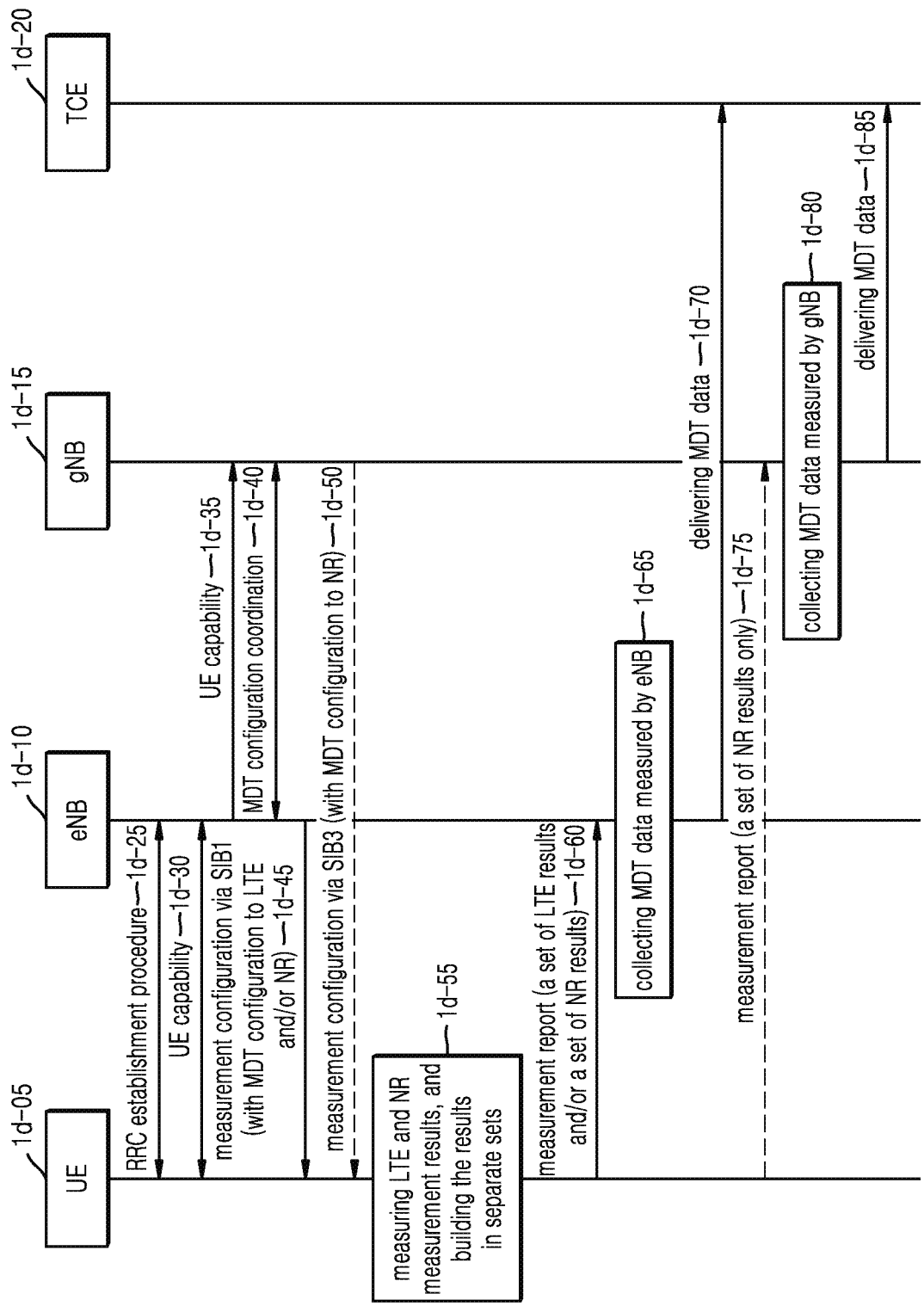
FIG. 4 is a diagram for describing a MDT operation according to another embodiment.

FIG. 4 is a diagram for describing a MDT operation according to another embodiment.

Referring to FIG. 4, a UE 1d-05 may transit to a connected mode through an RRC establishment procedure with a LTE base station 1d-10, in operation 1d-25. Thereafter, the UE 1d-05 may be additionally connected to a NR base station 1d-15 to perform data communication, as necessary. The NR base station 1d-15 may be connected to the LTE base station 1d-10 to transmit and receive required configuration information and general data to provide the UE 1d-05 with a service. According to an embodiment, the LTE base station 1d-10 may be connected to a MME which is a core network, whereas the NR base station 1d-15 may need not to be connected to an AMF. The structure is called EN-DC. The UE 1d-05 may report UE capability information to one of the LTE base station 1d-10 and the NR base station 1d-15, in operation 1d-30. In FIG. 4, a procedure in which the UE 1d-05 reports UE capability information to the LTE base station 1d-10 is shown as an example, however, the UE 1d-05 may report UE capability information to the NR base station 1d-15. According to an embodiment, the UE capability information may indicate whether to support a MDT operation. Particularly, the UE capability information may indicate whether to support a MDT operation in a MR-DC structure such as EN-DU. The LTE station 1d-10 which has received the UE capability information may forward the UE capability information to another base station (in FIG. 4, the NR base station 1d-15) existing in the EN-DC structure, in operation 1d-35.

According to an embodiment, both the LTE base station 1d-10 and the NR base station 1d-15 may set a connected mode MDT operation (immediate MDT) for the UE 1d-05. Also, the LTE base station 1d-10 and the NR base station 1d-15 may report MDT configuration information to each other and coordinate the MDT configuration information, in operation 1d-40. The coordination may be performed as follows.

Option 1: the LTE base station 1d-10 may report MDT configuration information triggered by itself to the NR base station 1d-15, and the NR base station 1d-15 may oppose, reject, or request change of the MDT configuration information. The NR base station 1d-15 may report MDT configuration information triggered by itself to the LTE base station 1d-10, and the LTE base station 1d-10 may oppose, reject, or request change of the MDT configuration information.

Option 2: the LTE base station 1d-10 may not report MDT configuration information triggered by itself to the NR base station 1d-15. However, the NR base station 1d-15 may report MDT configuration information triggered by itself to the LTE base station 1d-10, and the LTE base station 1d-10 may oppose, reject, or request change of the MDT configuration information.

Option 3: the LTE base station 1d-10 and NR base station 1d-15 may need not to report MDT configuration information triggered by themselves to the other base station, and may set a MDT operation independently.

Option 4: although the LTE base station 1d-10 and NR base station 1d-15 report MDT configuration information triggered by themselves to the other base station, the LTE base station 1d-10 and NR base station 1d-15 may set a MDT operation independently. That is, the other base station may not oppose, reject, or request change of the MDT configuration information.

Separately from the coordination described above, there may be a case in which MDT operations cannot be simultaneously performed due to limited UE capability. Accordingly, to prevent MDT operations from being simultaneously performed, Option 1 or Option 2 may need to be applied.

Through the coordination, the LTE base station 1d-10 or the NR base station 1d-15 may set a MDT operation for the UE 1d-05. The LTE base station 1d-10 may provide MDT configuration information to the UE 1d-05 through a predefined RRC message, in operation 1d-45. The predefined RRC message may belong to SRB1. The NR base station 1d-15 may provide MDT configuration information to the UE 1d-05 through a predefined RRC message belonging to SRB3, in operation 1d-50. The UE 1d-05 may perform a MDT operation according to the MDT configuration information.

According to an embodiment, the LTE base station 1d-10 and NR base station 1d-15 may simultaneously provide independent MDT configuration information, respectively, to the UE 1d-05. In this case, the UE 1d-05 may perform two kinds of MDT operations simultaneously according to the MDT configuration information, in operation 1d-55. The UE 1d-05 may collect a frequency indicated by each piece of configuration information, and signal intensities and qualities measured from cells, and configure information that is to be reported to the LTE base station 1d-10 and the NR base station 1d-15. The UE 1d-05 may report a measurement result to the LTE base station 1d-10, in operation 1d-60. The LTE base station 1d-10 may collect measurement information related to the UE 1d-05, in operation 1c-65, and transmit the measurement information to a TCE server 1d-20, in operation 1d-70. The UE 1d-05 may report the measurement result to the NR base station 1d-15, in operation 1d-75. The NR base station 1d-15 may collect measurement information related to the UE 1d-05, in operation 1d-80, and transmit the measurement information to the TCE server 1d-20, in operation 1d-85.

Figure 5:
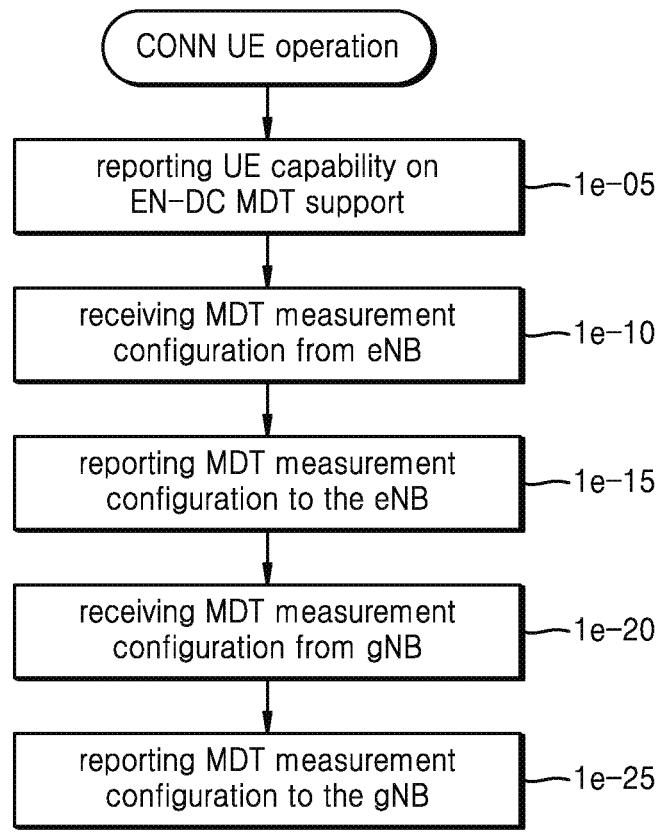
FIG. 5 is a flowchart illustrating operations of a user equipment (UE) according to an embodiment.

FIG. 5 is a flowchart illustrating operations of a UE according to an embodiment.

In operation 1e-05, the UE may report UE capability information indicating that the UE can perform a MDT operation (in an EN-DC structure) to a LTE base station.

In operation 1e-10, the UE may receive MDT configuration information from the LTE base station.

In operation 1e-15, the UE may collect MDT measurement information according to the MDT configuration information, and report the MDT measurement information to the LTE base station.

In operation 1e-20, the UE may receive MDT configuration information from a NR base station.

In operation e-25, the UE may collect MDT measurement information according to the MDT configuration information, and report the MDT measurement information to the NR base station.

Figure 6:
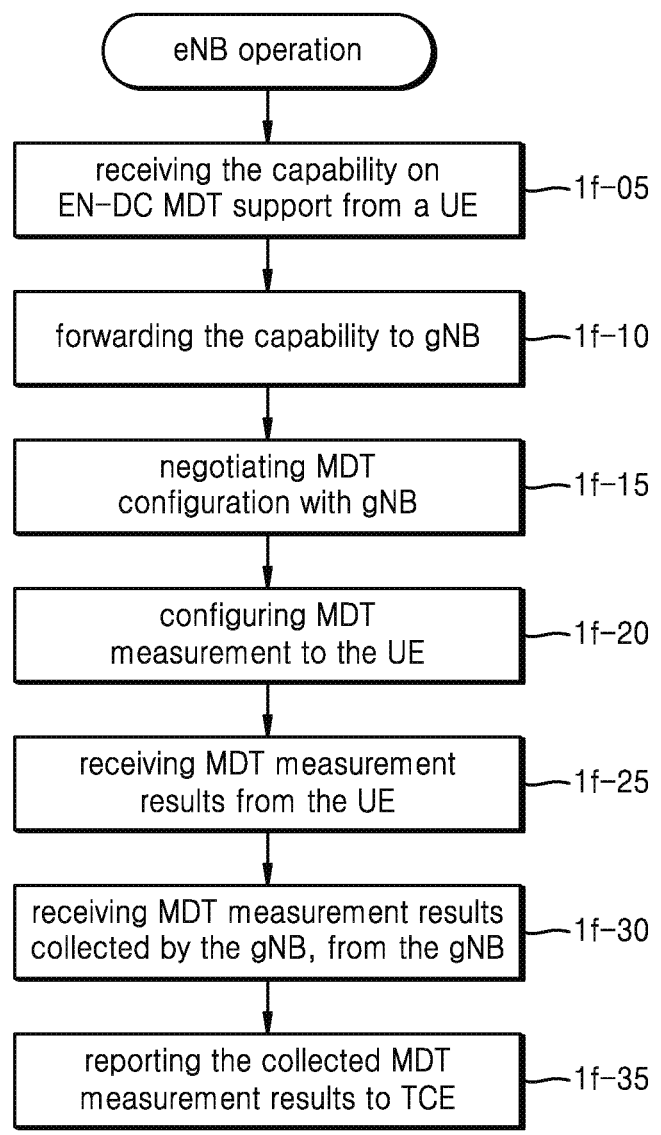
FIG. 6 is a flowchart illustrating operations of a long term evolution (LTE) base station according to an embodiment.

FIG. 6 is a flowchart illustrating operations of a LTE base station (eNB) according to an embodiment.

In operation 1f-05, the LTE base station may receive, from a UE, a report about UE capability information indicating that the UE can support a MDT operation in EN-DC.

In operation 1f-10, the LTE base station may forward the UE capability information to a NR base station (gNB) which is the other base station of EN-DC.

In operation 1f-15, the LTE base station may trigger a MDT operation for the UE, and coordinate MDT configuration information with the NR base station.

In operation 1f-20, the LTE base station may transmit the coordinated MDT configuration information to the UE.

In operation 1f-25, the LTE base station may receive a report about MDT measurement information from the UE.

In operation 1f-30, the LTE base station may receive a report about MDT measurement information collected by the NR base station.

In operation 1f-35, the LTE base station may report the MDT measurement information collected from the UE and the NR base station to a TCE server.

Figure 7:
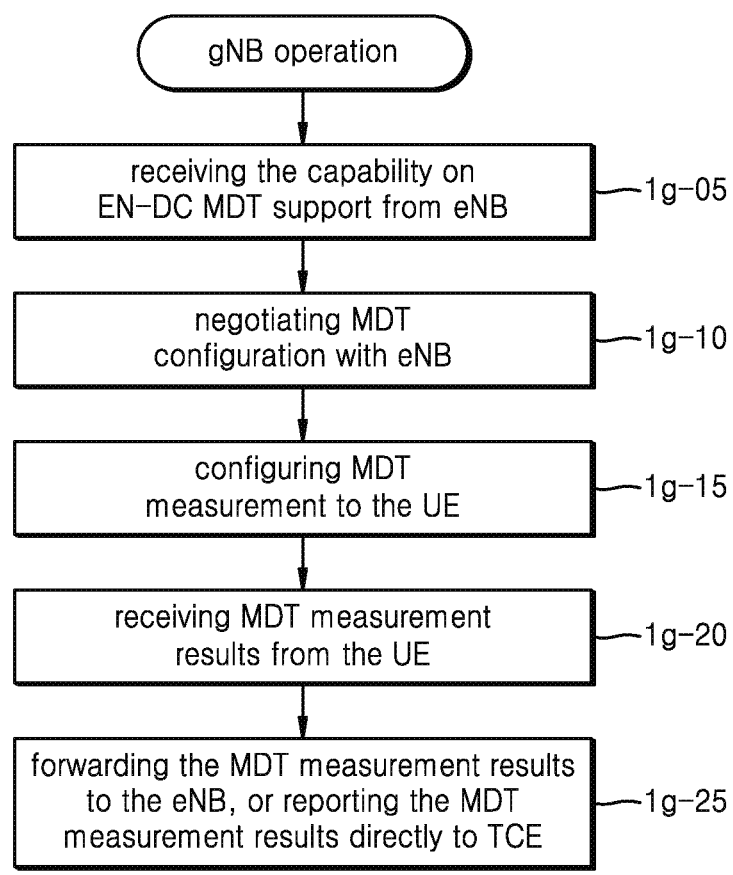
FIG. 7 is a flowchart illustrating operations of a new radio (NR) base station according to an embodiment.

FIG. 7 is a flowchart illustrating operations of a NR base station according to an embodiment.

In operation 1g-05, the NR base station may receive a report about UE capability information indicating that a specific UE can support a MDT operation in EN-DC from an LTE base station which is the other base station.

In operation 1g-10, the NR base station may trigger a MDT operation for the UE, and coordinate MDT configuration information with the LTE base station.

In operation 1g-15, the NR base station may transmit the coordinated MDT configuration information to the UE.

In operation 1g-20, the NR base station may receive a report about MDT measurement information from the UE.

In operation 1g-25, the NR base station may itself forward the MDT measurement information collected from the UE to a TCE server, or may forward the MDT measurement information to the LTE base station.

Figure 8:
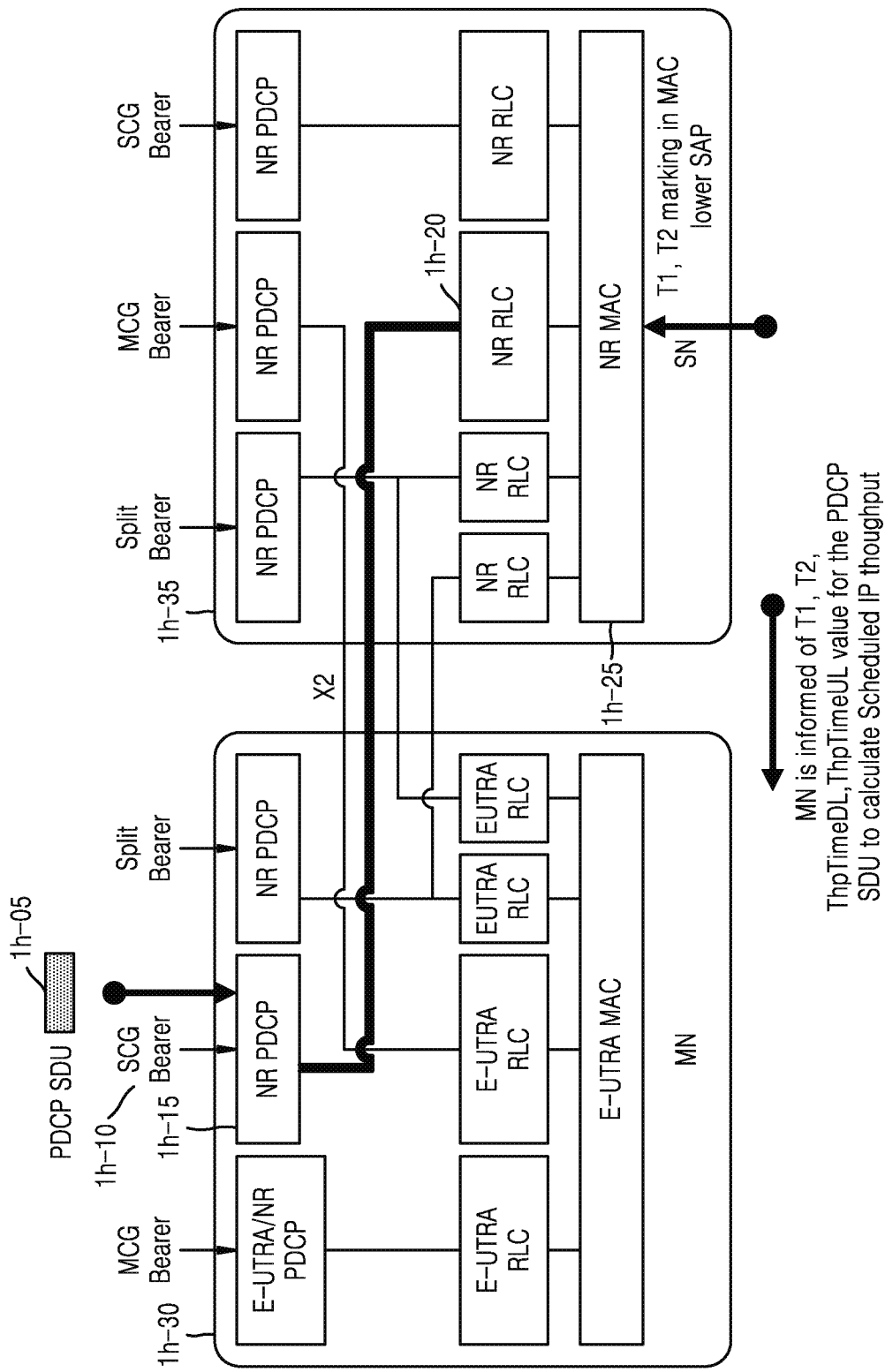
FIG. 8 is a diagram for describing a procedure of obtaining a scheduled IP throughput in a EUTRA (LTE)-NR dual connectivity (EN-DC) structure, according to an embodiment.

FIG. 8 is a diagram for describing a procedure of obtaining a scheduled IP throughput in an EN-DC structure according to an embodiment.

A DL scheduled IP throughput may be deduced by Equations below.

TABLE 2

| Definition | Scheduled IP Throughput for MDT in DL. Throughput of PDCP SDU bits in downlink for data bursts that are large enough to require transmissions to be split across several TTIs, by excluding the data transmitted in the last TTI of the data burst. Only data transmission time is considered. i.e. |
|---|---|

TABLE 2-continued when data transmission over Uu has begun but not yet finished. The measurement is performed per RAE per UE, and also per UE, For successful reception, the reference point is MAC upper SAP.
A data burst begins at the point in time when the first transmission begins after a PDCP SDU becomes available for transmission, where previously no PDCP SDUs were available for transmission for the E-RAB (in per E-RAB per UE case) or for any E-RABs of the UE (in per UE case). The data burst ends at the point in time when transmissions are successfully completed and there is no portion of a PDCP SDU pending transmission for the E-RAB (in per E-RAB per UE case) or for any E-RABs of the UE (in per UE case).
This measurement is obtained by the following formula for a measurement period:

If $\Sigma$ ThpTimeDl > 0, $\dfrac{\sum \text{ThpVolDl}}{\sum \text{ThpTimeDl}} \times 1000$ [kbits/s], where If $\Sigma$ ThpTimeDl = 0, 0 [kbits/s]
Explanations of the parameters can be found in the table 4.1.7.1-1 below.

TABLE 3

| | |
|---|---|
| ThpTimeDl | If the data burst is small enough to be transmitted in one TTI, then ThpTimeDl = 0.<br>Otherwise, ThpTimeDl = T1 − T2 [ms]. |
| T1 | If transmission of a data burst is ongoing at the end of the measurement period, then T1 is the point in time when the measurement period ends.<br>Otherwise, T1 is the point in time when the last TTI used for transmission of the data burst begins. |
| T2 | If transmission of a data burst is ongoing at the start of the measurement period, then T2 is the point in time when the measurement period begins.<br>Otherwise, T2 is the point in time when the first TTI used for transmission of the data burst begins. |
| ThpVolDl | The data volume, counted on PDCP SDU level, in kbits successfully transmitted (acknowledged by UE) in DL for the data burst excluding the data volume transmitted in the last TTI. |

A UL scheduled IP throughput may be deduced by Equations below.

TABLE 4

| | |
|---|---|
| Definition | Scheduled IP Throughput for MDT in UL. eNB estimate of the throughput of PDCP SDU bits in uplink for data bursts that are large enough to require transmissions to be split across several TTIs, by excluding the data transmitted in the last TTI of the data burst. Only data transmission time is considered, i.e. when data transmission over Uu has begun but not yet finished. The measurement is performed per UE. For successful reception, the reference point is MAC upper SAP.<br>A data burst begins at the point in time when the first transmission begins after the eNB estimate of the UE buffer size becomes greater than zero for at least one E-RAB of the UE, where previously the estimate was zero for all E-RABs of the UE. The data burst ends at the point in time when transmissions are successfully completed and the eNB estimate of the UE buffer size becomes zero for all E-RABs of the UE, where previously the estimate was greater than zero for at least one E-RAB of the UE.<br>This measurement is obtained by the following formula for a measurement period:<br><br>If $\Sigma$ ThpTimeUl > 0, $\dfrac{\sum \text{ThpVolUl}}{\sum \text{ThpTimeUl}} \times 1000$ [kbits/s], where<br><br>If $\Sigma$ ThpTimeUl = 0, 0 [kbits/s]<br>Explanations of the parameters can be found in the table 4.1.7.2-1 below. |

TABLE 5

| | |
|---|---|
| ThpTimeUl | If the data burst is small enough to be transmitted in one TTI, then ThpTimeUl = 0.<br>Otherwise, ThpTimeUl = T1 − T2 [ms]. |
| T1 | If transmission of a data burst is ongoing at the end of the measurement period, then T1 is the point in time when the measurement period ends.<br>Otherwise, T1 is the point in time when the last TTI used for transmission of the data burst begins. |
| T2 | If transmission of a data burst is ongoing at the start of the measurement period, then T2 is the point in time when the measurement period begins.<br>Otherwise, T2 is the point in time when the first TTI used for transmission of the data burst begins. |
| ThpVolUl | The data volume counted on PDCP SDU level in kbits received in UL for the data burst excluding the data volume received in the last TTI used for transmission of the data burst. |

To deduce a scheduled IP throughput, a data volume (per packet data convergence protocol service data unit (PDCP SDU)) may need to be measured in a PDCP layer, and an effective transmission time may need to be measured in a MAC layer. That is, because values of T1 and T2 are deduced for each transmission time interval (TTI), T1 and T2 may be times at which a MAC PDU is transferred to PHY in MAC lower SAP. Also, whether data transmission is successful may be determined in MAC upper SAP (between a MAC layer and a RLC layer). Then, a scheduled IP throughput may be calculated by using the deduced values. In the EN-DC structure, a PDCP layer, a MAC layer, and a RLC layer for a specific radio bearer (RB) may belong to different base stations. According to an embodiment, in a MN terminated SCG bearer 1h-10 in EN-DC, a PDCP layer 1h-15 may exist in a LTE base station 1h-30 which is a master node (MN) and a RLC layer 1h-20 and a MAC layer 1h-25 may exist in a NR base station 1h-35 which is a secondary node (SN). A PDCP SDU 1h-05 which has arrived at an upper SAP of the PDCP layer 1h-15 of the LTE base station 1h-30 may be processed and transmitted to the RLC layer 1h-20 of the NR base station 1h-35. Accordingly, because a NR base station finally calculating a scheduled IP throughput needs to have all required information, NR base stations may need to share the information.

In the disclosure, a NR base station calculating a scheduled IP throughput may be a NR base station having a PDCP layer. When RLC and MAC layers for a specific RB do not belong to a base station having a PDCP layer and belong to another base station, information collected by the RLC and MAC layers of the other base station may be transmitted to the base station having the PDCP layer. The information to be transmitted may be values of T1 and T2 or ThpTimeDL and ThpTimeUL. The information may be transmitted through a predefined control message of an X2 interface.

As another method, a base station calculating a scheduled IP throughput may be a base station that has provided MDT configuration information. Information collected by the PDCP, RLC, and MAC layers may be transmitted to the base station that has provided the MDT configuration information. The information to be transmitted may include all values required to deduce a scheduled IP throughput. The information may be transmitted through a predefined control massage of an X2 interface. When the PDCP, RLC, and MAC layers belong to the base station that has provided the MDT configuration information, information measured by the layers may need not to be transmitted.

Figure 9:
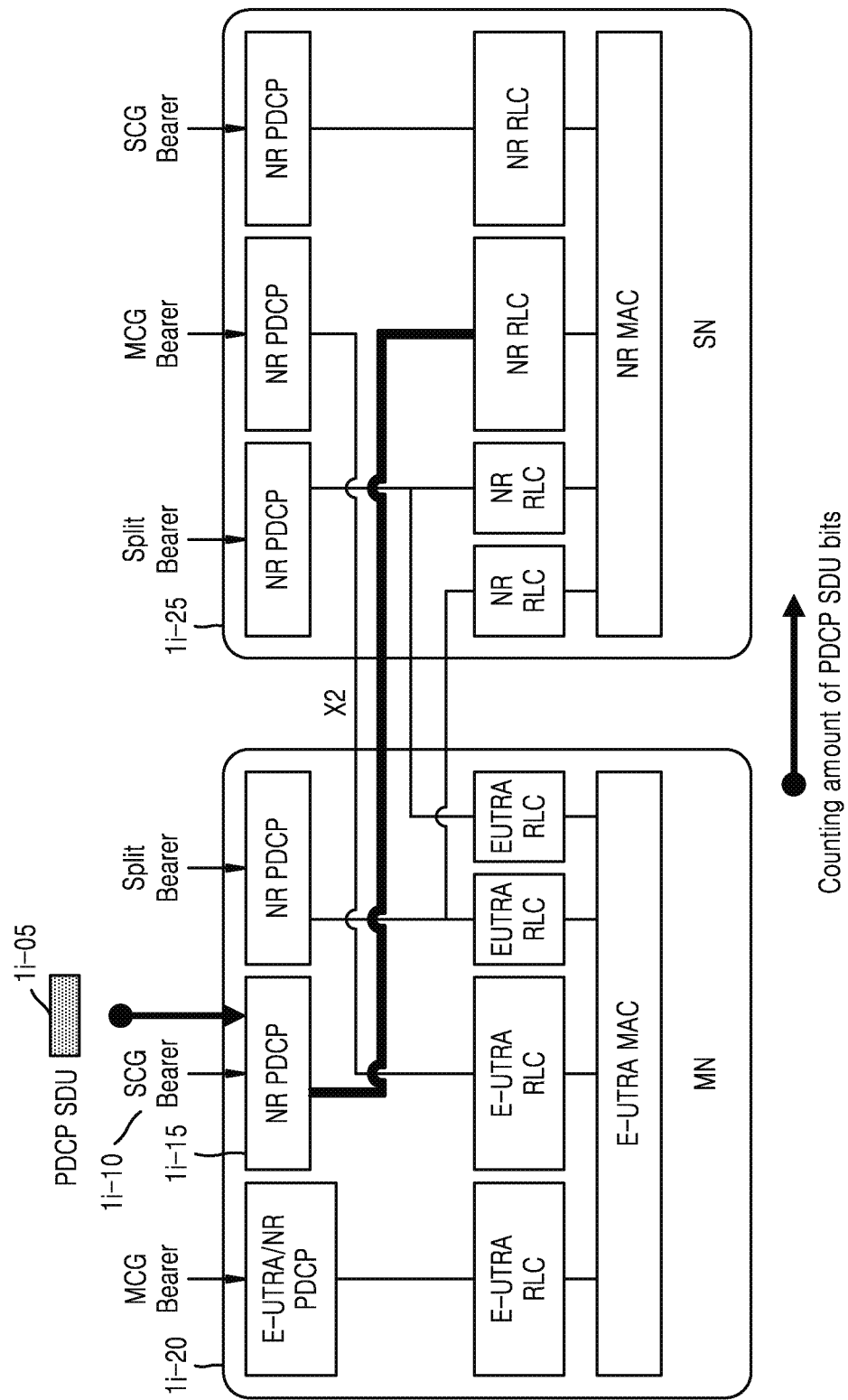
FIG. 9 is a diagram for describing a procedure of obtaining a data volume in an EN-DC structure, according to an embodiment.

FIG. 9 is a diagram for describing a procedure of obtaining and deducing a data volume in an EN-DC structure according to an embodiment.

Uplink and downlink data volumes may be defined as follows

TABLE 6

| Definition | Data Volume for MDT in DL. Amount of PDCP SDU bits in downlink delivered from PDCP layer to RLC layer in a measurement period. The measurement is performed per QCI per UE. The unit is kbit. |
|---|---|

TABLE 7

| Definition | Data Volume for MDT in UL. Amount of PDCP SDU bits successfully received by the eNB in uplink in a measurement period. The measurement is performed per QCI per UE. The unit is kbit. |
|---|---|

According to the definitions, a PDCP SDU 1i-05 is criterion for measuring a data volume. Accordingly, only a PDCP layer 1i-15 may be involved in the corresponding measurement information.

In the disclosure, a base station calculating a data volume may be a base station having a PDCP layer. For example, in a MN terminated SCG bearer 1i-10 of EN-DC, a LTE base station 1i-20 may be a base station having the PDCP layer 1i-15. When a base station having a PDCP layer is different from a base station that has provided MDT configuration information, data volume information may be reported to the base station that has provided the MDT configuration information. For example, when a base station that has provided MDT configuration information is a NR base station 1i-25 in the EN-DC, and a base station having a PDCP layer for a specific bearer is the LTE base station 1i-20, the LTE base station 1i-20 may transmit collected data volume information to the NR base station 1i-25. The data volume information may be transmitted through a predefined control message of an X2 interface.

Figure 10:
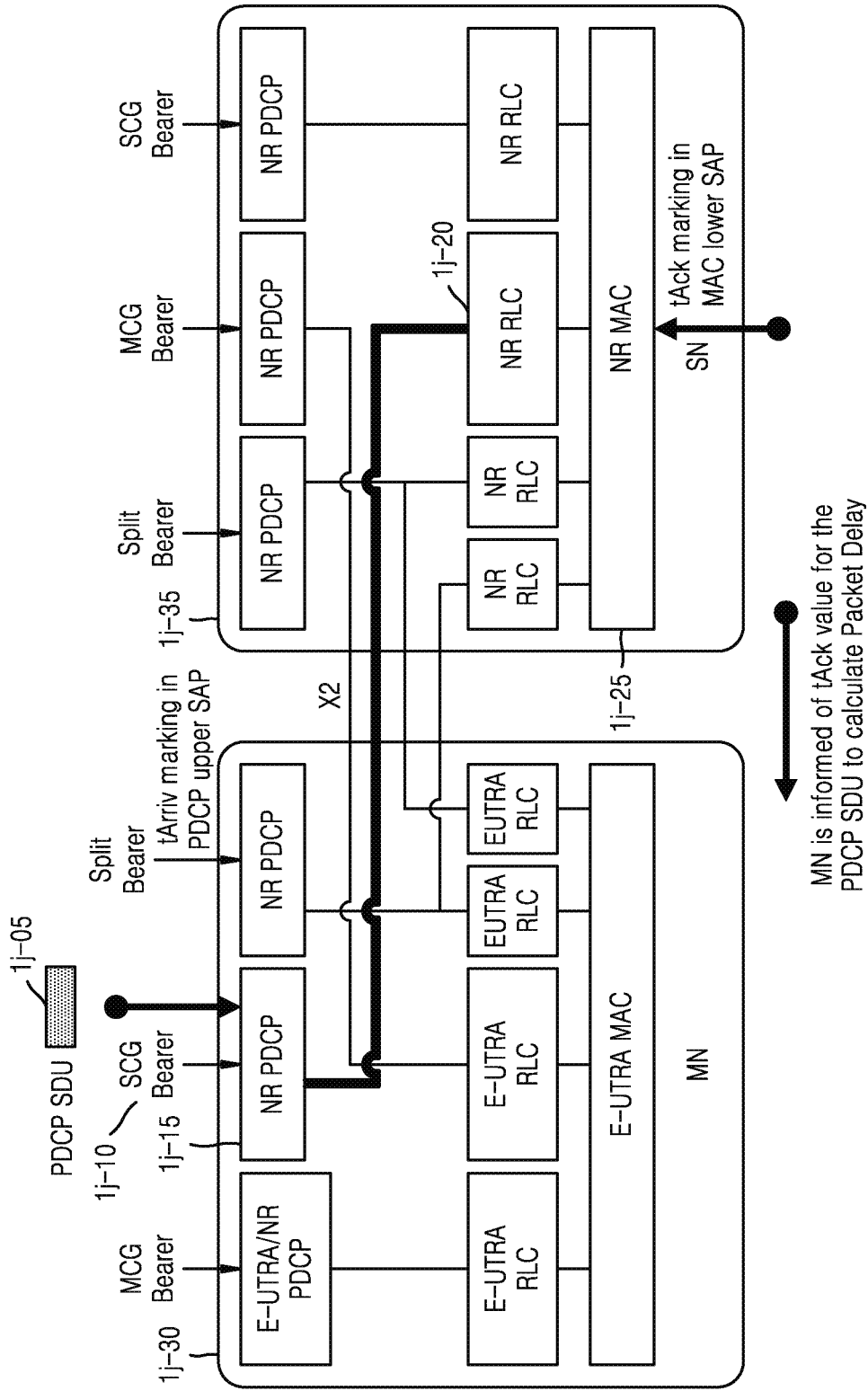
FIG. 10 is a diagram for describing a procedure for obtaining a DL packet delay in an EN-DC structure, according to an embodiment.

FIG. 10 is a diagram for describing a procedure for obtaining a DL packet delay in an EN-DC structure according to an embodiment.

A downlink packet delay may be deduced by Equations below.

TABLE 8

| Definition | Packet Delay in the DL per QCI. This measurement refers to packet delay for DRBs. For arrival of packets the reference point is PDCP upper SAP. For successful reception the reference point is MAC lower SAP. The measurement is done separately per QCI. Detailed Definition: $$M(T, qci) = \left\lfloor \frac{\left|\sum_{\forall i} tAk(i) - tArriv(i)\right|}{I(T)} \right\rfloor, \text{ where}$$ explanations can be found in the table 4.1.4.1-1 below. |
|---|---|

TABLE 9

| M(T, qci) | Packet Delay in the DL per QCI, averaged during time period T. Unit: Integer ms. |
|---|---|
| tArriv(i) | The point in time when PDCP SDU i arrives. |
| tAck(i) | The point in time when the last piece of PDCP SDU i was received by the UE according to received HARQ feedback information. |
| i | A PDCP SDU that arrives at the PDCP upper SAP during time period T. PDCP SDU for which HARQ acknowledgement is not received for all parts shall not be included in the calculation. |
| I(T) | Total number of PDCP SDUs i. |
| T | Time Period during which the measurement is performed |

To deduce a DL packet delay, a PDCP layer may need to measure values of tArrive and I(T), and a MAC layer may need to measure a time tAck at which HARP feedback of each PDCP SDU is received. Then, through the obtained values, a packet delay may be calculated. In an EN-DC structure, a PDCP layer and a MAC layer for a specific RB may belong to different base stations. For example, in a MN terminated SCG bearer 1j-10 of EN-DC, a PDCP layer 1j-15 may exist in a LTE base station 1j-30 which is a MN, and a RLC layer 1j-20 and a MAC layer 1j-25 may exist in a NR base station 1j-35 which is a SN. A PDCP SDU 1j-05 which has arrived at a upper SAP of the PDCP layer 1j-15 of the LTE base station 1j-30 may be processed and transmitted to the RLC layer 1j-20 of the NR base station 1j-35. Accordingly, because a base station finally calculating a packet delay needs to have all required information, base stations may need to share the information.

In the disclosure, a base station calculating a packet delay may be a base station having a PDCP layer. When a MAC layer for a specific RB does not belong to a base station having a PDCP layer and belongs to another base station, information collected by the MAC layer of the other base station may be transmitted to the base station having the PDCP layer. The information to be transmitted may include a value of rAck. The information may be transmitted through a predefined control message of an X2 interface.

As another method, a base station calculating a packet delay may be a base station that has provided MDT configuration information. Information collected by the PDCP and MAC layers may be transmitted to the base station that has provided the MDT configuration information. The information to be transmitted may include all values required to deduce a packet delay. The information may be transmitted through a predefined control massage of the X2 interface. When the PDCP and MAC layers belong to the base station that has provided the MDT configuration information, information measured by the layers may need not to be transmitted.

Figure 11:
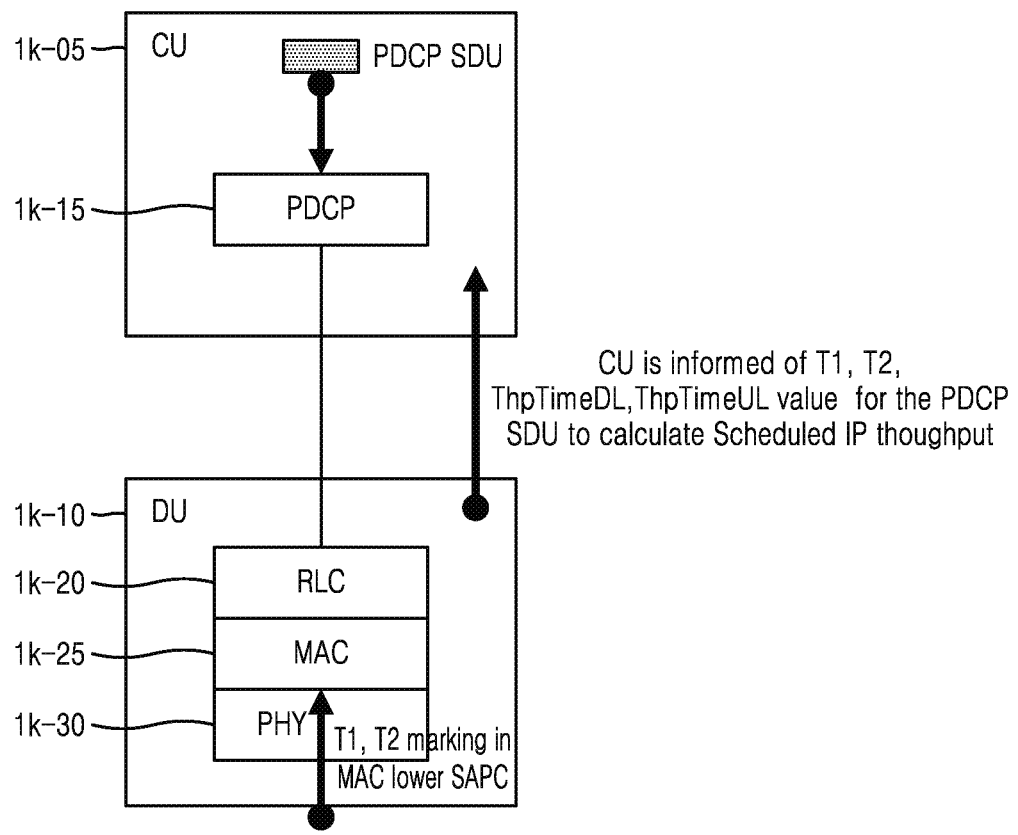
FIG. 11 is a diagram for describing a procedure of obtaining a scheduled IP throughput in a central unit-distributed unit (CU-DU) structure, according to an embodiment.

FIG. 11 is a diagram for describing a procedure of obtaining a scheduled IP throughput in a CU-DU structure according to an embodiment.

The CU-DU structure is a base station structure in which a node (CU) 1k-05 having a PDCP layer 1k-15 or the upper layer is spatially or physically separated from a node (DU) 1k-10 having a RLC layer 1k-20, a MAC layer 1k-25, and a PHY layer 1k-30. As described above, several protocol layers may be involved in measuring a scheduled IP throughput and a DL packet delay, and in a CU-DU structure, all protocol layers may not exist in the same node. Accordingly, in an embodiment, a CU having a PDCP layer may receive information required for calculating measurement information from a DU to obtain the measurement information. Also, the CU may function to transmit the measurement information to a TCE server.

In the disclosure, a node calculating a scheduled IP throughput may be a CU having a PDCP layer. Information collected by RLC and MAC layers of a DU may be transmitted to the CU having the PDCP layer. The information to be transmitted may include values of T1 and T1 or ThpTimeDL and ThpTimeUL. The information may be transmitted through a predefined control message of an X2 interface or a F1-AP interface.

Figure 12:
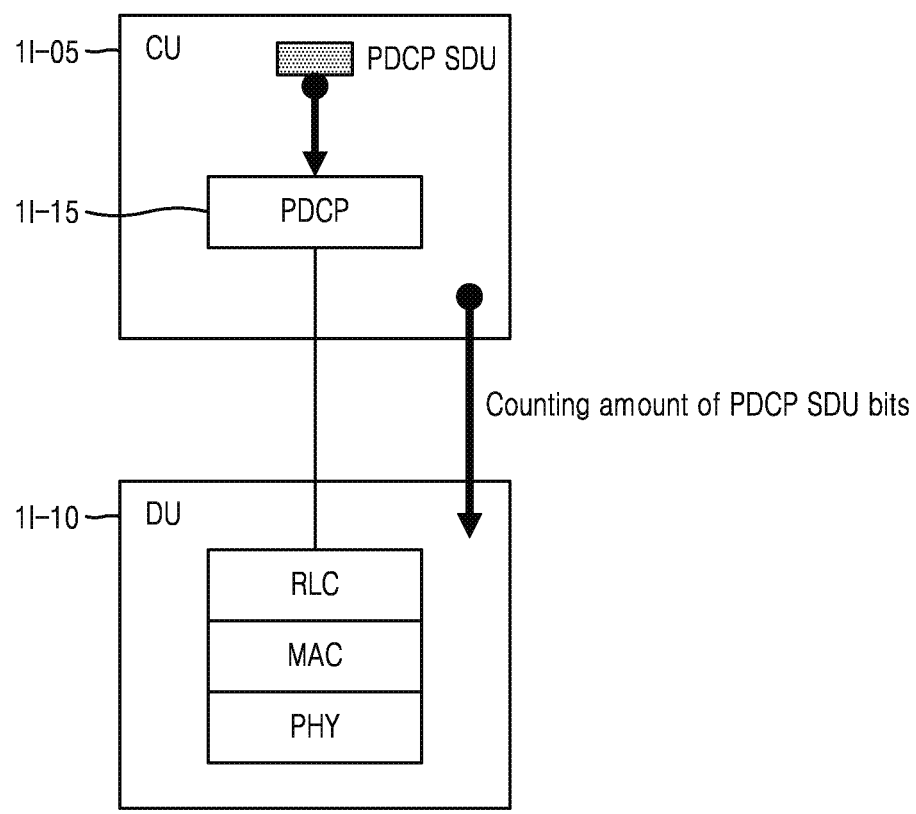
FIG. 12 is a diagram for describing a procedure of obtaining a data volume in a CU-DU structure, according to an embodiment.

FIG. 12 is a diagram for describing a procedure of obtaining a data volume in a CU-DU structure according to an embodiment.

A data volume may be defined as an amount of bits of PDCP SDU 1l-15 that is transmitted/received between a PDCP layer and a RLC layer. According to an embodiment, a PDCP layer of a CU 1l-05 may count an amount of bits that are transmitted to a DU 1l-10 to obtain a data volume.

Figure 13:
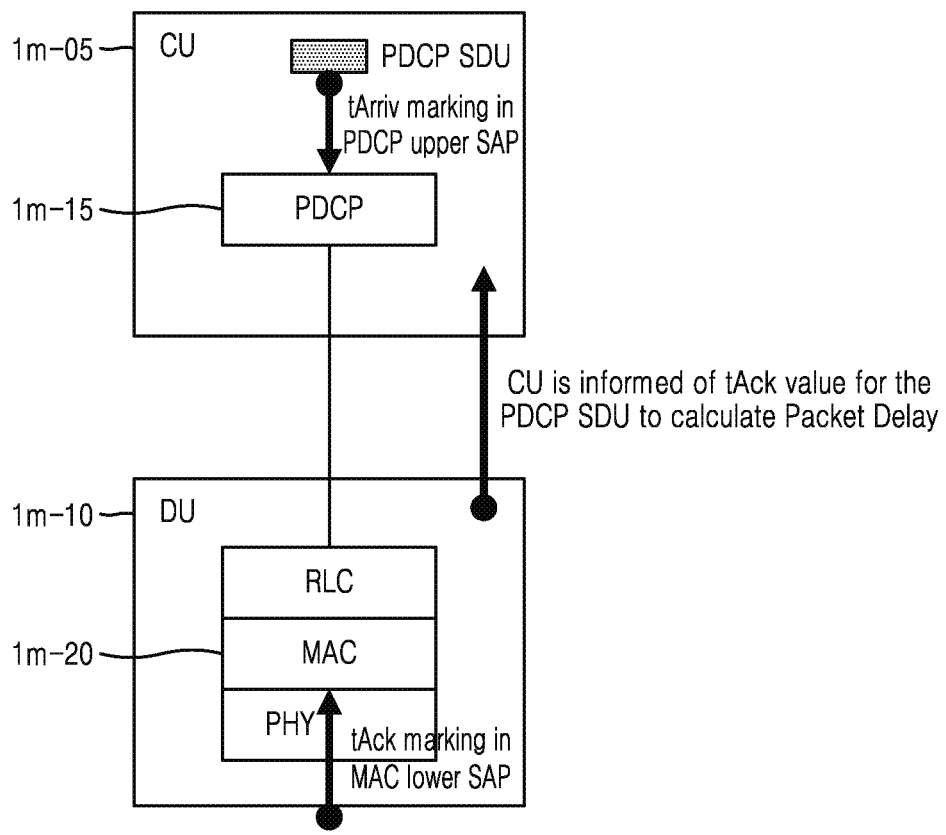
FIG. 13 is a diagram for describing a procedure for obtaining a DL packet delay in a CU-DU structure, according to an embodiment.

FIG. 13 is a diagram for describing a procedure for obtaining a DL packet delay in a CU-DU structure according to an embodiment.

In the disclosure, a node calculating a packet delay may be a CU 1m-05 having a PDCP layer 1m-15. Information collected by a MAC layer 1m-20 of a DU 1m-10 may be transmitted to the CU 1m-05 having the PDCP layer 1m-15. The information to be transmitted may include a value of rAck. The information may be transmitted through a predefined control message of an X2 interface or a F1-AP interface. The PDCP layer 1m-15 of the CU 1m-05 may obtain a value of tArriv.

Figure 14:
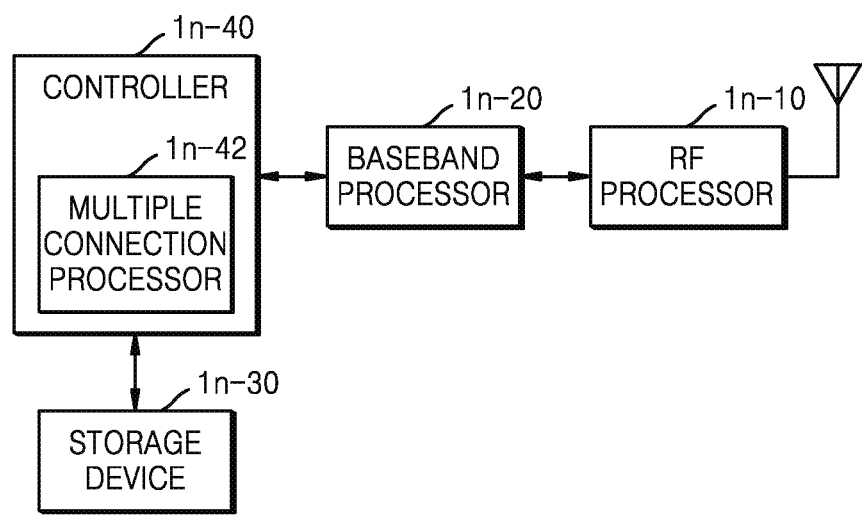
FIG. 14 is a block diagram illustrating a structure of a UE according to an embodiment.

FIG. 14 is a block diagram illustrating a structure of a UE according to an embodiment.

Referring to FIG. 14, the UE may include a radio frequency (RF) processor 1n-10, a baseband processor 1n-20, a storage device 1n-30, and a controller 1n-40.

Figure 20:
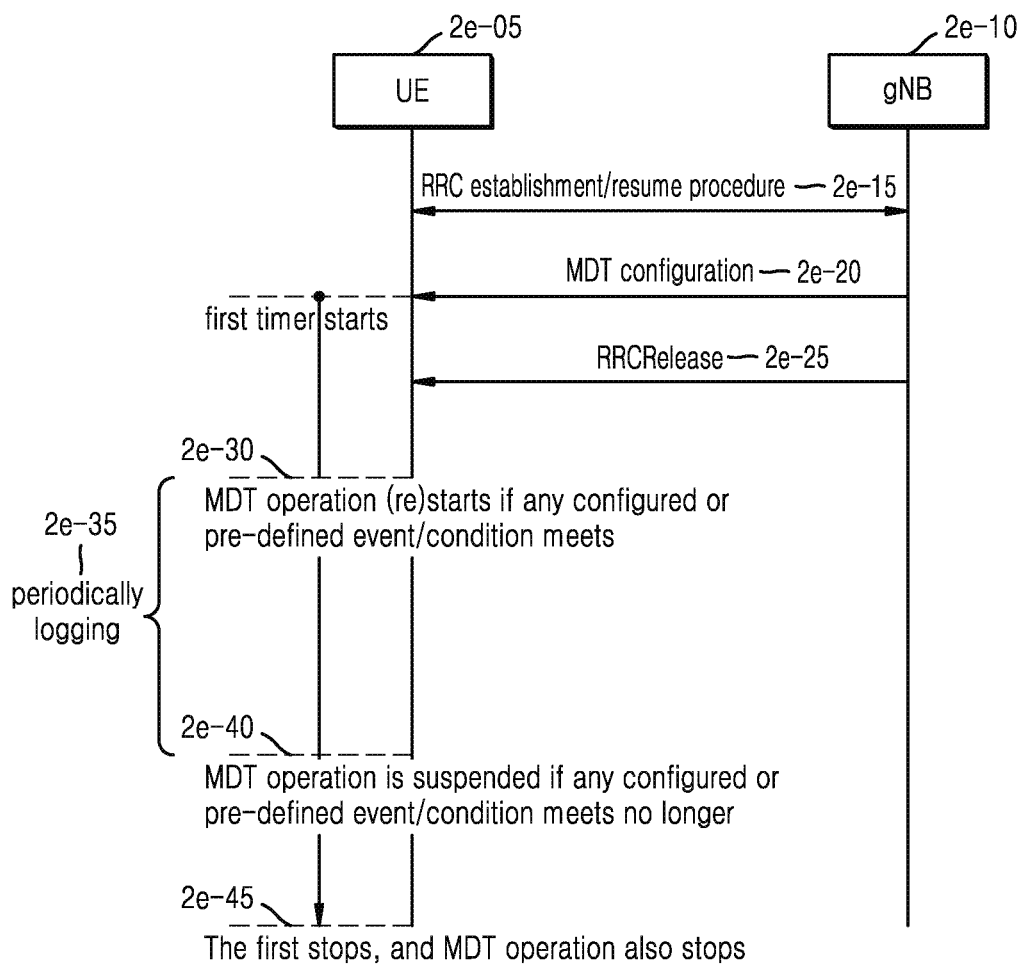
FIG. 20 is a diagram for describing a procedure of performing event-based logging, according to an embodiment.

The RF processor 1n-10 may perform a function of transmitting/receiving signals through band conversion, amplification, etc. of the signals through a wireless channel. That is, the RF processor 1n-10 may up-convert a baseband signal provided from the baseband processor 1n-20 into an RF band signal, transmit the RF band signal through an antenna, and down-convert an RF band signal received through the antenna into a baseband signal. For example, the RF processor 1n-10 may include a transmitter filter, a receiver filter, an amplifier, a mixer, an oscillator, a digital to analog convertor (DAC), an analog to digital convertor (ADC), etc. In FIG. 20, a single antenna is shown, however, the UE may include a plurality of antennas. Also, the RF processor 1n-10 may include a plurality of RF chains. Furthermore, the RF processor 1n-10 may perform beamforming. For beamforming, the RF processor 1n-10 may adjust phases and magnitudes of signals that are transmitted/received through a plurality of antennas or antenna elements. Also, the RF processor 1n-10 may perform multiple input multiple output (MIMO), and receive several layers when performing a MIMO operation.

The baseband processor 1n-20 may perform a function of conversion between a baseband signal and a bit string according to a physical layer specification of a system. For example, upon data transmission, the baseband processor 1n-20 may encode and modulate a transmission bit string to generate complex symbols. Also, upon data reception, the baseband processor 1n-20 may demodulate and decode a baseband signal provided from the RF processor 1n-10 to restore a reception bit string. For example, according to an OFDM method, upon data transmission, the baseband processor 1n-20 may encode and modulate a transmission bit string to generate complex symbols, map the complex symbols to subcarriers, and then configure OFDM symbols through an inverse fast Fourier transform (IFFT) operation and cyclic prefix (CP) insertion. Also, upon data reception, the baseband processor 1n-20 may segment a baseband signal provided from the RF processor 1n-10 in unit of OFDM symbols, restore signals mapped to subcarriers through a fast Fourier transform (FFT) operation, and then restore a reception bit string through demodulation and decoding.

The baseband processor 1n-20 and the RF processor 1n-10 may transmit and receive signals as described above. Accordingly, the baseband processor 1n-20 and the RF processor 1n-10 may be referred to as a transmitter, a receiver, a transceiver, or a communicator. Furthermore, at least one of the baseband processor 1n-20 and the RF processor 1n-10 may include a plurality of communication modules to support a plurality of different radio access technologies. Also, at least one of the baseband processor 1n-20 and the RF processor 1n-10 may include different communication modules to process signals of different frequency bands. For example, the different radio access technologies may include a wireless local area network (WLAN) (for example, IEEE 802.11), a cellular network (for example, LTE), etc. Also, the different frequency bands may include a super high frequency (SHF) (for example, 2.NRHz, NRhz) band and a millimeter (mm) wave (for example, 60 GHz) band.

The storage device 1n-30 may store data, such as a basic program, an application program, configuration information, etc., for operations of the UE. Also, the storage device 1n-30 may provide the stored data according to a request from the controller 1n-40.

The controller 1n-40 may control overall operations of the UE. For example, the controller 1n-40 may transmit and receive signals through the baseband processor 1n-20 and the RF processor 1n-10. Also, the controller 1n-40 may record data in the storage device 1n-30 and read data from the storage device 1n-30. For this, the controller 1n-40 may include at least one processor. For example, the controller 1n-40 may include a communication processor (CP) that performs a control for communication and an application processor (AP) that controls an upper layer such as an application program.

Figure 15:
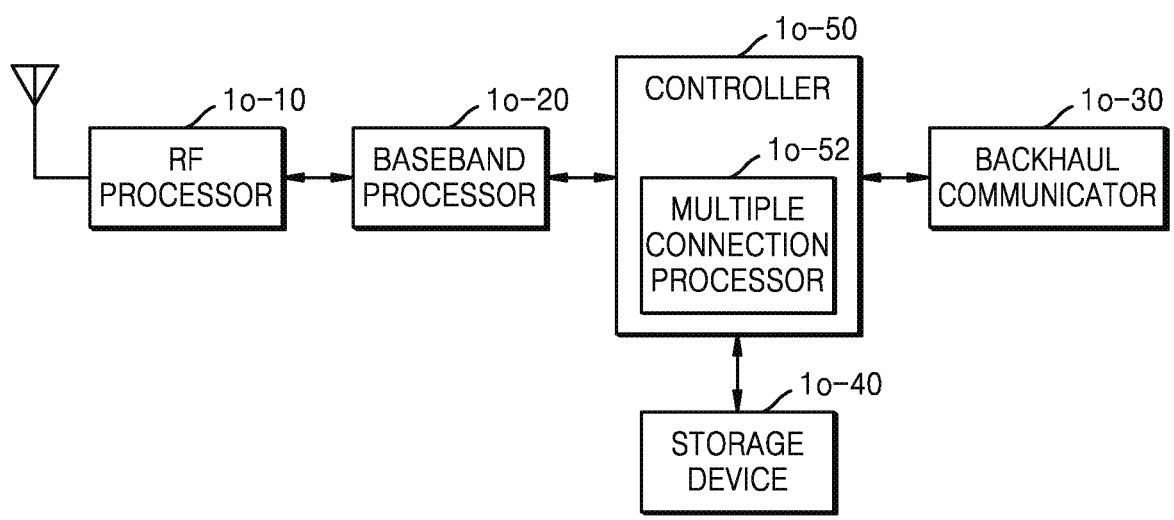
FIG. 15 is a block diagram illustrating a structure of a base station according to an embodiment.

FIG. 15 is a block diagram illustrating a structure of a base station according to an embodiment.

As shown in FIG. 15, the base station may include a RF processor 1o-10, a baseband processor 1o-20, a backhaul communicator 1o-30, a storage device 1o-40, and a controller 1o-50.

The RF processor 1o-10 may perform a function for transmitting and receiving signals through a wireless channel, such as band conversion, amplification, etc. of signals. That is, the RF processor 1o-10 may up-convert a baseband signal provided from the baseband processor 1o-20 into a RF band signal, transmit the RF band signal through an antenna, and down-convert an RF band signal received through the antenna into a baseband signal. For example, the RF processor 1o-10 may include a transmission filter, a reception filter, an amplifier, a mixer, an oscillator, a DAC, an ADC, etc. In FIG. 15, a single antenna is shown, however, the base station may include a plurality of antennas. Also, the RF processor 1o-10 may include a plurality of RF chains. Furthermore, the RF processor 1o-10 may perform beamforming. For beamforming, the RF processor 1o-10 may adjust phases and magnitudes of signals that are transmitted/received through the plurality of antennas or antenna elements. The RF processor 1o-10 may perform a downlink MIMO operation by transmitting one or more layers.

The baseband processor 1o-20 may perform a function of conversion between baseband signals and bit strings according to a physical layer specification. For example, upon data transmission, the baseband processor 1o-20 may encode and modulate a transmission bit string to generate complex symbols. Also, upon data reception, the baseband processor 1o-20 may demodulate and decode a baseband signal provided from the RF processor 1o-10 to restore a reception bit string. For example, according to the OFDM method, upon data transmission, the baseband processor 1o-20 may encode and modulate a transmission bit string to generate complex symbols, map the complex symbols to subcarriers, and then construct OFDM symbols through IFFT and CP insertion. Also, upon data reception, the baseband processor 1o-20 may segment a baseband signal provided from the RF processor 1o-10 in units of OFDM symbols, restore signals mapped to subcarriers through FFT, and then restore a reception bit string through demodulation and decoding. The baseband processor 1o-20 and the RF processor 1o-10 may transmit and receive signals as described above. Accordingly, the baseband processor 1o-20 and the RF processor 1o-10 may be also referred to as a transmitter, a receiver, a transceiver, a communicator, or a wireless communicator.

The backhaul communicator 1o-30 may provide an interface for communicating with other nodes in a network. That is, the backhaul communicator 1o-30 may convert a bit string that is transmitted from a master base station to another node (for example, a secondary base station, a core network, etc.) into a physical signal, and convert a physical signal received from another node into a bit string.

The storage device 1o-40 may store data, such as basic programs, application programs, and configuration information, for operations of the master base station. Particularly, the storage device 1o-40 may store information about a bearer assigned to a UE connected to the base station, a measurement result reported from the connected UE, etc. Also, the storage device 1o-40 may store information that is used as determination criterion about whether to provide multiple connections to the UE or whether to release multiple connections to the UE. Also, the storage device 1o-40 may provide the stored data according to a request from the controller 1o-50.

The controller 1o-50 may control overall operations of the master base station. For example, the controller 1o-50 may transmit and receive signals through the baseband processor 1o-20 and the RF processor 1o-10 or through the backhaul communicator 1o-30. Also, the controller 1o-50 may write data in the storage device 1o-40 or read data from the storage device 1o-40. To write or read data, the controller 1o-50 may include at least one processor.

Figure 16:
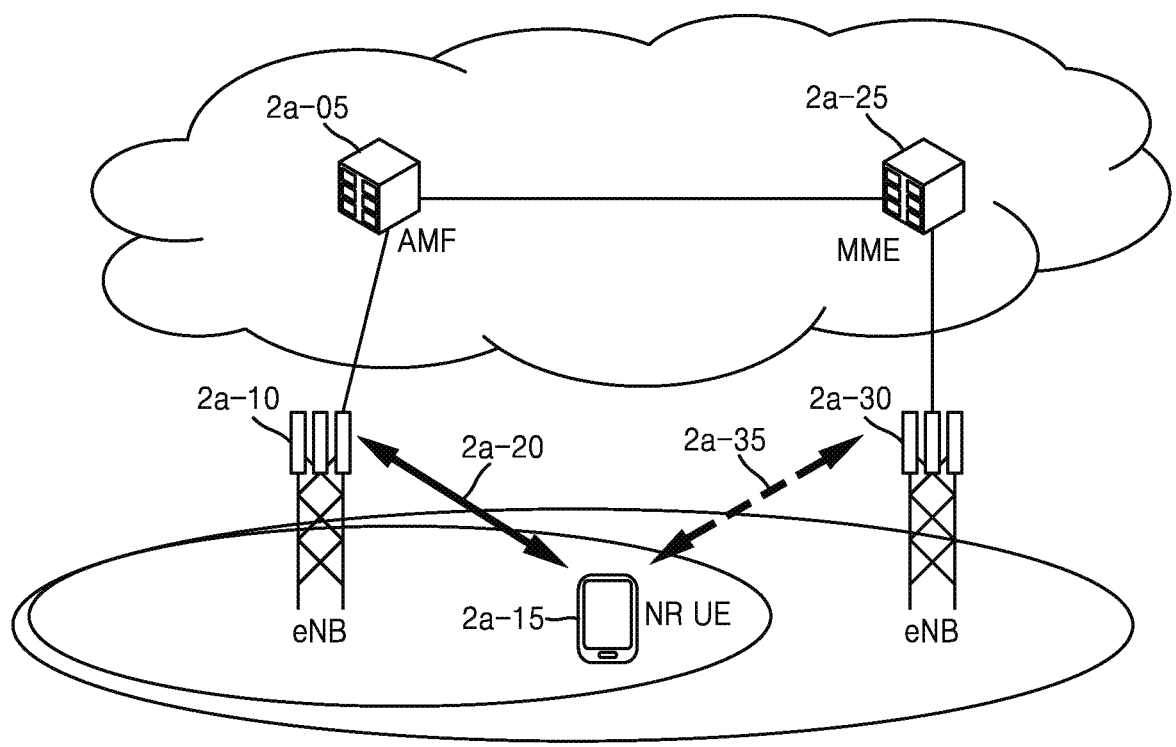
FIG. 16 illustrates a structure of a next-generation mobile communication system to which an embodiment is applied.

FIG. 16 illustrates a structure of a next-generation mobile communication system to which an embodiment is applied.

Referring to FIG. 16, a radio access network of a next-generation mobile communication system (5G or NR system) may be configured with a next-generation base station (NR NB, NR gNB, or gNB) 2a-10 and an AMF 2a-05 or a NR CN (or NG CN). A UE (or NR UE) 2a-15 may be connected to an external network through the NR gNB 2a-10 and the AMF 2a-05.

In FIG. 16, the NR gNB 2a-10 may correspond to an eNB of a LTE system. The NR gNB 2a-10 may be connected to the NR UE 2a-15 through a wireless channel, and provide a superior service than a legacy node B. In the next-generation mobile communication system, because all user traffics are serviced through a shared channel, a device for performing scheduling by collecting status information of UEs, such as buffer statuses of UEs, available transmission power states of UEs, channel states of UEs, etc., is needed. The NR gNB 2a-10 may function as such a device. An NR gNB 2a-10 may generally control a plurality of cells, and may be configured with a CU for managing control and signaling and a DU being in charge of transmission/reception of signals. To implement ultra high-speed data transmission compared to LTE systems, the next-generation mobile communication system may use a legacy maximum bandwidth or more, and combine OFDM as air interface technology with beam-forming technology. Also, the next-generation mobile communication system may apply AMC of determining a modulation scheme and a channel coding rate according to a channel state of a UE. The AMF 2a-05 may perform functions, such as mobility support, bearer setup, QoS setup, etc. The AMF 2a-05 may be in charge of various control functions, as well as a mobility management function for UEs, and may be connected to a plurality of base stations. Also, the next-generation mobile communication system (5G or NR system) may interwork with legacy LTE systems, and the AMF 2a-05 may be connected to a MME 2a-25 through a network interface. The MME 2a-25 may be connected to an eNB 2a-30 which is a legacy base station. A UE supporting EN-DC may be connected to the eNB 2a-30, as well as the gNB 2a-10, to transmit and receive data (2a-35). In the EN-DC, only LTE systems may be connected to a core network (MME 2a-25), and the LTE systems may be connected to a NR base station.

Figure 17:
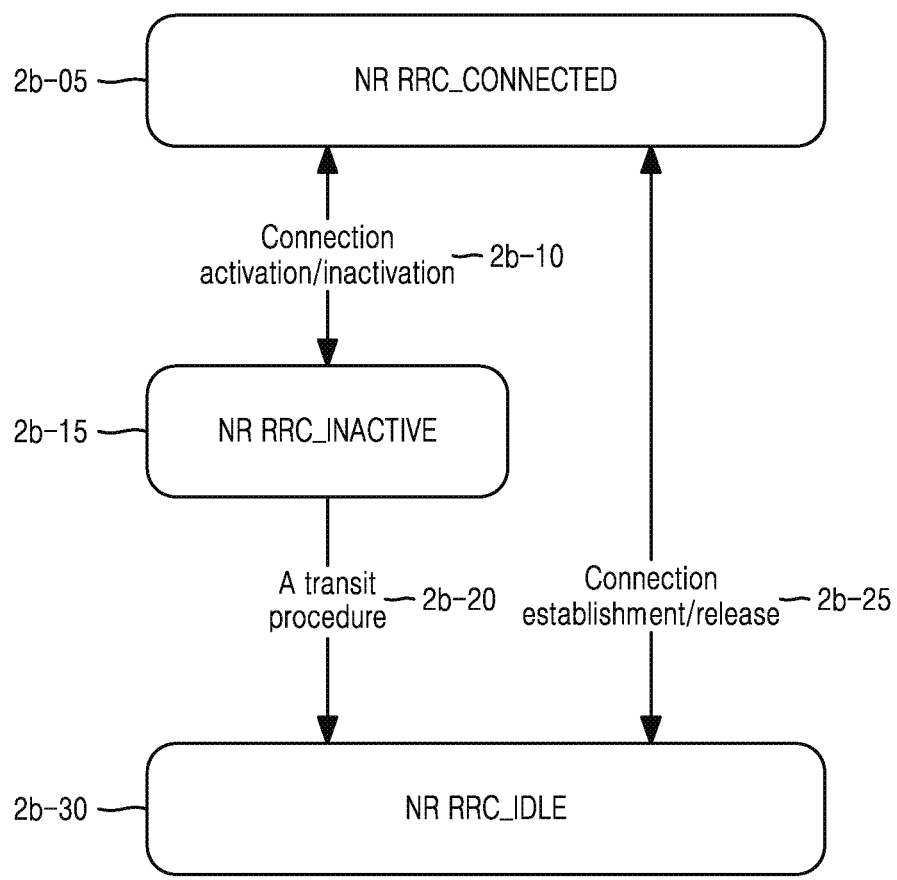
FIG. 17 is a diagram for describing a transition of a radio resource control (RRC) state in a next-generation mobile communication system to which an embodiment is applied.

FIG. 17 is a diagram for describing transition of an RRC state in a next-generation mobile communication system to which an embodiment is applied.

Next-generation mobile communication system supports three RRC states. A connected mode (RRC_CONNECTED) 2b-05 may refer to an RRC state in which the UE can transmit and receive data. An idle mode (RRC_IDLE) 2b-30 may refer to an RRC state in which the UE monitors whether paging is transmitted to itself. The two modes may be RRC states that are also applied to legacy LTE systems, and may be the same as those of the legacy LTE systems. In the next-generation mobile communication system, an RRC inactive state (RRC_INACTIVE) 2b-15 may be newly defined. In the RRC inactive state (RRC_INACTIVE) 2b-15), UE context may be maintained in a base station and a UE, and RAN-based paging may be supported. Features of the new RRC inactive state (RRC_INACTIVE) 2b-15 are listed as follows.

Cell re-selection mobility;
CN-NR RAN connection (both C/U-planes) has been established for UE;
The UE AS context is stored in at least one gNB and the UE;
Paging is initiated by NR RAN;
RAN-based notification area is managed by NR RAN; and
NR RAN knows the RAN-based notification area which the UE belongs to.

The new RRC inactive state (RRC_INACTIVE) 2b-15 may transit to the connected mode (RRC_CONNECTED) 2b-05 or the idle mode (RRC_IDLE) 2b-30 by using a specific procedure. The RRC inactive state (RRC_INACTIVE) 2b-15 (also, referred to as an inactive mode) may transit to the connected mode (RRC_CONNECTED) 2b-05 according to a connection activation procedure, and the connected mode (RRC_CONNECTED) 2b-05 may transit to the inactive mode (RRC_INACTIVE) 2b-15 according to a connection inactivation procedure, in operation 2b-10. The connection activation/inactivation procedure may be performed by transmitting/receiving at least one RRC message between the UE and the base station, and may be configured with at least one operation. Also, the inactive mode (RRC_INACTIVE) 2b-15 may transit to the idle mode (RRC_IDLE) 2b-30 (2b-20) according to a specific procedure, in operation 2b-20. The specific procedure may be one of various methods, such as exchanging specific messages or a timer-based or event-based method. Transition between the connected mode (RRC_CONNECTED) 2b-05 and the idle mode (RRC_IDLE) 2b-30 may be based on legacy LTE technology. That is, mode transition may be performed through a connection establishment/release procedure, in operation 2b-25.

Figure 18:
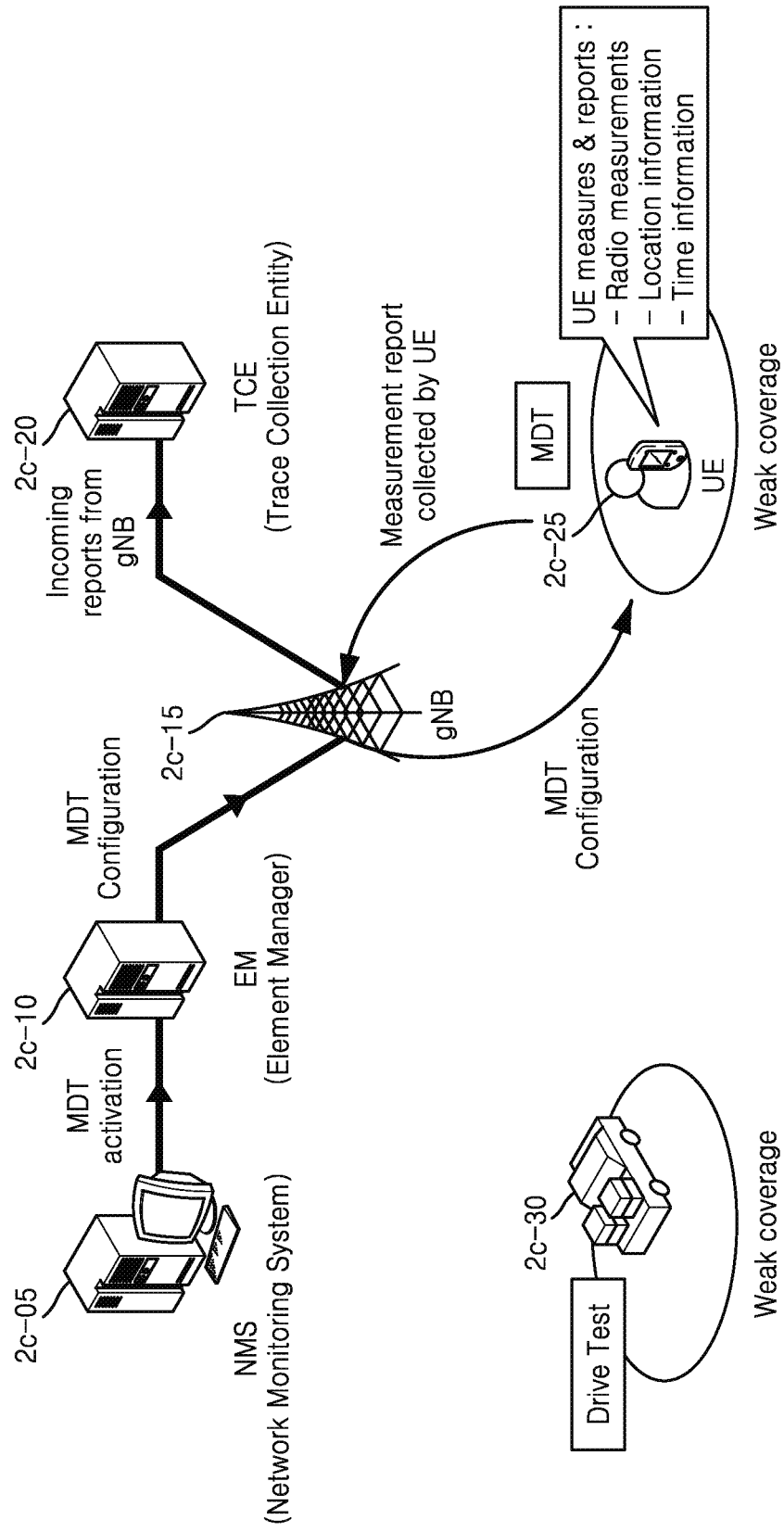
FIG. 18 is a diagram for describing technology of collecting and reporting cell measurement information, according to another embodiment.

FIG. 18 is a diagram for describing technology of collecting and reporting cell measurement information according to another embodiment.

Upon network establishment or network optimization, a mobile network operator performs a procedure of measuring signal intensity in a general expected service area and arranging or rearranging base stations in the service area based on the measured signal intensity. In the procedure, the mobile network operator loads signal measurement equipment in a vehicle and moves to collect cell measurement information in the service area. The procedure is called a drive test. The drive test requires a long time and a lot of expense.

To support operations, such as cell reselection or handover, addition of a serving cell, etc., upon movement between cells, UEs may have a function for measuring signals received from a base station. Accordingly, instead of the drive test, UEs existing in a service area may be used. The procedure is called a minimization of drive test (MDT). The mobile network operator may set a MDT operation for specific UEs through several components of a network, and the UEs for which the MDT operation has been set and is in a connected mode RRC_Connected, an idle mode RRC_Idle, or an inactive mode RRC_Inactive may collect and store signal intensity information from a serving cell and neighboring cells. Also, the UEs for which the MDT operation has been set may store various information, such as position information, time information, and signal quality information, together with the signal intensity information. The stored information may be reported to the network when the corresponding UEs are in the connected mode RRC__Connected, and, in this case, the stored information may be transferred to a specific server.

Information collected by a UE may be reported to a base station through a MDT operation, and the MDT operation may be classified into immediate MDT and logged MDT.

The immediate MDT may be an operation of immediately reporting collected information to a network. Because the immediate MDT is to immediately report collected information, a UE being in a connected mode may perform the immediate MDT. Generally, the immediate MDT may reuse a RRM procedure for supporting operations, such as handover, addition of a serving cell, etc., and position information, time information, etc. may be additionally reported.

The logged MDT may be an operation of storing collected information, instead of immediately reporting the collected information to a network, and reporting, after a UE transits to a connected mode, the stored information to the network. Generally, a UE being in an idle mode in which stored information cannot be immediately reported to a network may perform the logged MDT. According to an embodiment, a UE belonging to a next-generation mobile communication system and being in an inactive mode may perform the logged MDT. When a specific UE is in a connected mode, a network may provide the UE with configuration information for performing a logged MDT operation, and the UE which has received the configuration information may collect and store the configuration information after the UE transits to an idle mode or an inactive mode.

TABLE 10

| | RRC state |
| --- | --- |
| Immediate MDT | RRC_Connected |
| Logged MDT | RRC_Idle, RRC_Inactive |

Figure 19:
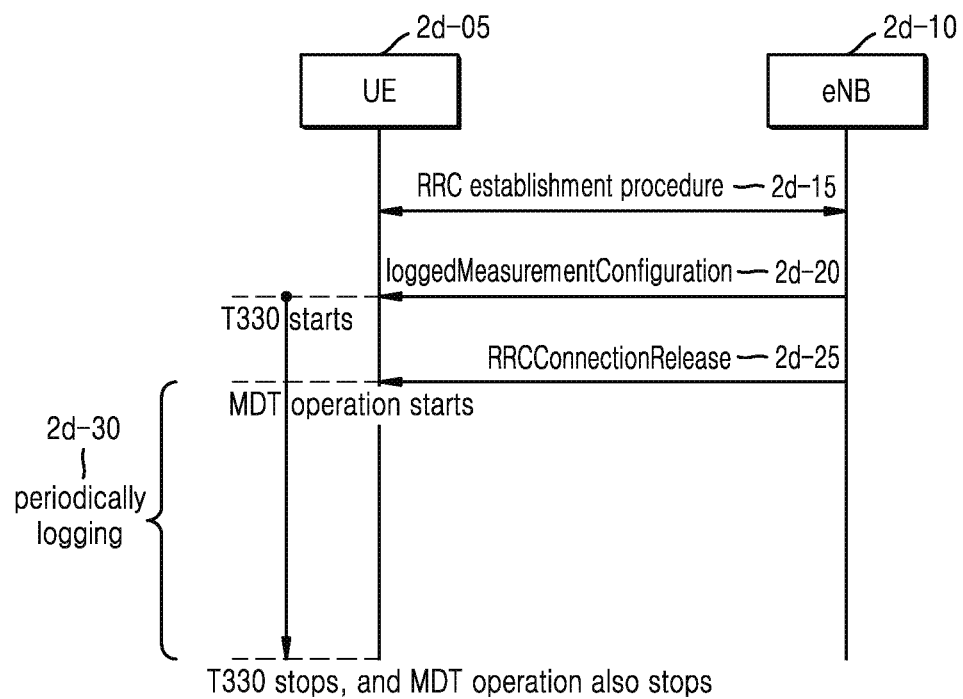
FIG. 19 is a diagram for describing a procedure of collecting and reporting cell measurement information in a LTE system, according to an embodiment.

FIG. 19 is a diagram for describing a procedure of collecting and reporting cell measurement information in a LTE system according to an embodiment.

Referring to FIG. 19, a UE 2d-05 may transit to a connected mode through an RRC establishment procedure with a LTE base station (eNB) 2d-10, in operation 2d-15. The LTE base station 2d-10 may set a logged MDT operation for the UE 2d-05 through a loggedMeasurementConfiguration message, in operation 2d-20. When the UE 2d-05 receives the loggedMeasurementConfiguration message, the UE 2d-05 may start a T330 timer. The LTE base station 2d-10 may transit the connected mode of the UE 2d-05 to an idle mode by using an RRCConnectionRelease message, in operation 2d-25. When the T330 timer is running, the UE 2d-05 may perform the logged MDT operation by using received configuration information. That is, the UE 2*d*-05 may collect and record predefined measurement information periodically, in operation 2*d*-30. The operation may be performed in the idle mode when the T330 timer is running. The T330 timer may be continuously running regardless of an RRC state. The UE 2*d*-05 may stop the corresponding operation when again transiting to the connected mode, although the T330 timer is still running. When the T330 timer is expired, the logged MDT operation may terminate.

In the disclosure, a condition for performing the logged MDT operation may be additionally considered. According to an embodiment, an amount of measurement information that can be recorded through a logged MDT operation may be limited by a UE memory size. Because a purpose of MDT is optimization of a service area, it may be efficient to perform a MDT operation while focusing on regions where signal quality or service quality is poor. Because measurement information of only regions with problems is reported to a network, signaling overhead which is caused by unnecessary information transmission may be minimized.

FIG. 20 is a diagram for describing a procedure of performing event-based logging according to an embodiment.

A UE 2*e*-05 may transit from an idle mode or an inactive mode to a connected mode through an RRC establishment procedure or an RRC resume procedure with a NR base station (gNB) 2*e*-10, in operation 2*e*-15. The base station 2*e*-10 may set a logged MDT operation for the UE 2*e*-05 by using a predefined RRC message, in operation 2*e*-20. Configuration information of logged MDT may be applied to the idle mode, to the inactive mode, or to both the idle mode and the inactive mode. The base station 2*e*-10 may indicate an RRC state of performing logged MDT with MDT configuration information. The MDT configuration information may include at least one condition for performing a logged MDT operation. When the UE 2*e*-05 receives the MDT configuration information, the UE 2*e*-05 may start a first timer. The base station 2*e*-10 may transit a connected mode of the UE 2*e*-05 to the idle mode or the inactive mode by using an RRCRelease message, in operation 2*e*-25. The MDT configuration information may be included in the RRCRelease message. By excluding transmitting a separate RRC message for providing MDT configuration information to the UE 2*e*-05, signaling overhead may be reduced.

According to an embodiment, when the UE 2*e*-05 being in the idle mode or the inactive mode meets a preset condition, the UE 2*e*-05 may perform logged MDT. When the UE 2*e*-05 is in the idle mode (or the inactive mode), the first timer is running, and the preset condition meets, the UE 2*e*-05 may perform a logged MDT operation, in operation 2*e*-30. When the preset condition meets, the UE 2*e*-05 may perform the logged MDT operation periodically, and store collected measurement information, in operation 2*e*-35. When the preset condition does not meet, the UE 2*e*-05 may stop the logged MDT operation, in operation 2*e*-40. According to an embodiment, the preset condition may be applied to both an entering condition and a leaving condition. Also, a condition for starting a logged MDT operation and a condition for stopping a logged MDT operation may be provided separately. Also, a plurality of conditions may be set. When the first timer is expired, the logged MDT operation may also terminate, in operation 2*e*-45. Recorded MDT measurement information may be deleted from a memory of the UE 2*e*-05 when a predefined time elapses after the first timer is expired.

Figure 21:
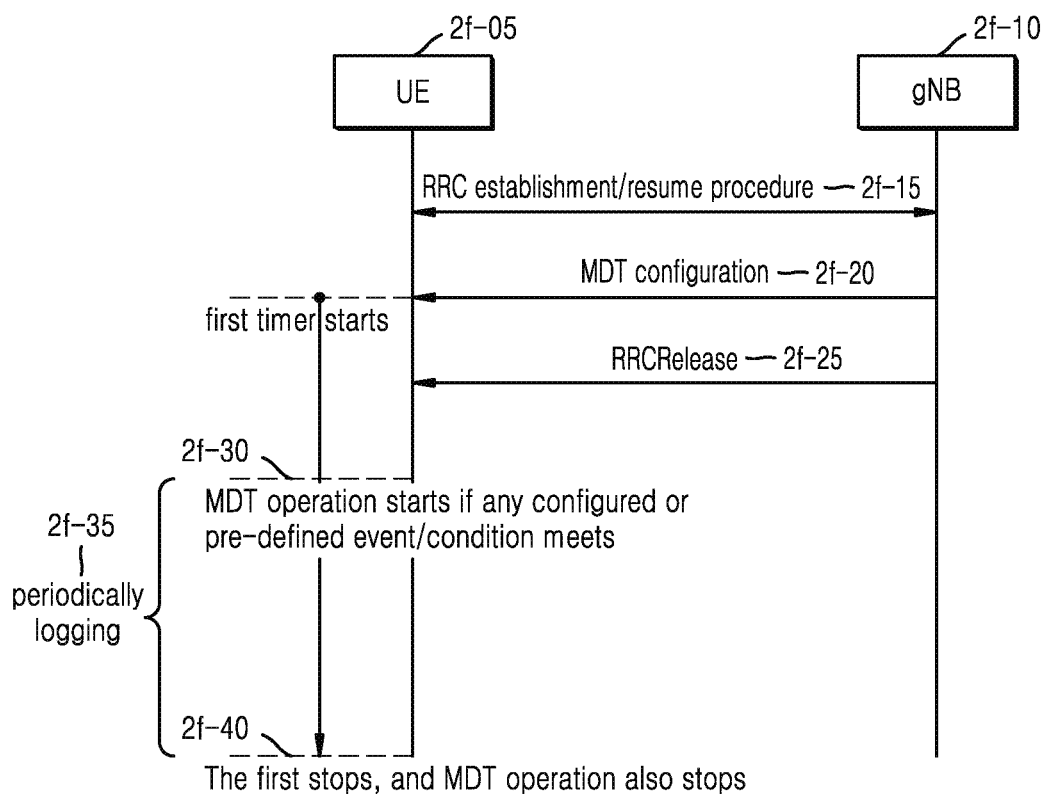
FIG. 21 is a diagram for describing a procedure of performing event-triggered periodic logging, according to an embodiment.

FIG. 21 is a diagram for describing a procedure of performing event-triggered periodic logging according to an embodiment.

A UE 2*f*-05 may transit from an idle mode or an inactive mode to a connected mode through an RRC establishment procedure or an RRC resume procedure with a NR base station (gNB) 2*f*-10, in operation 2*f*-15. The base station 2*f*-10 may set a logged MDT operation for the UE 2*f*-05 by using a predefined RRC message, in operation 2*f*-20. Configuration information of logged MDT may be applied to the idle mode, to the inactive mode, or to both the idle mode and the inactive mode. The base station 2*f*-10 may indicate an RRC state for performing logged MDT with MDT configuration information. The MDT configuration information may include at least one condition for performing a logged MDT operation. When the UE 2*f*-05 receives the MDT configuration information, the UE 2*f*-05 may start a first timer. The base station 2*f*-10 may transit the connected mode of the UE 2*f*-05 to the idle mode or the inactive mode by using an RRCRelease message, in operation 2*f*-25. The MDT configuration information may be included in the RRCRelease message. By excluding transmitting a separate RRC message for providing MDT configuration information to the UE 2*f*-05, signaling overhead may be reduced.

According to an embodiment, when the UE 2*f*-05 being in the idle mode or the inactive mode meets a preset condition, the UE 2*f*-05 may start logged MDT. When the UE 2*f*-05 is in the idle mode (or the inactive mode), the first timer is running, and the preset condition meets, the UE 2*f*-05 may start a logged MDT operation, in operation 2*f*-30. The preset condition may be an entering condition, and the logged MDT operation may be performed until the first timer is expired. That is, measurement information may be collected and stored periodically, in operation 2*f*-35. When transition to the connection mode again occurs although the first timer is running, the logged MDT may stop. A plurality of entering conditions may be set. When the first timer is expired, the logged MDT operation may also terminate, in operation 2*f*-40. Recorded MDT measurement information may be deleted from a memory of the UE 2*f*-05 when a predefined time elapses after the first timer is expired.

Figure 22:
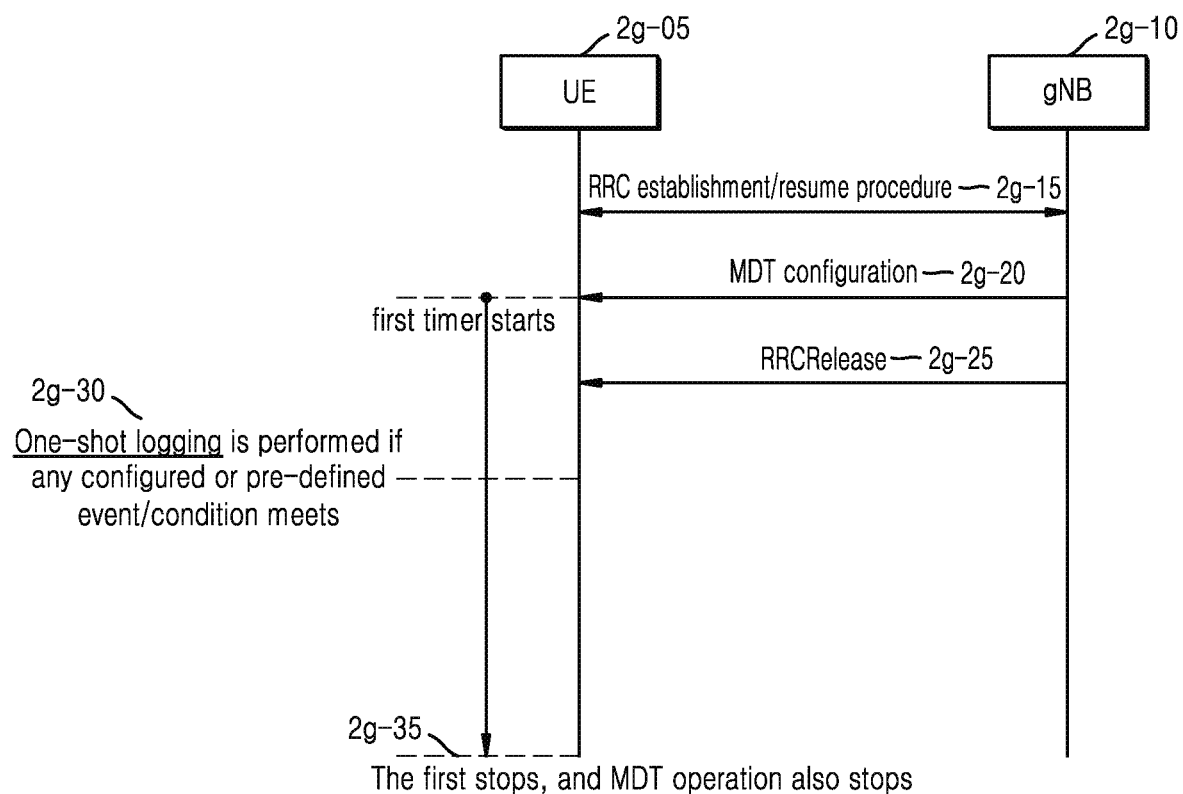
FIG. 22 is a diagram for describing a procedure of performing one-shot logging, according to an embodiment.

FIG. 22 is a diagram for describing a procedure of performing one-shot logging according to an embodiment.

A UE 2*g*-05 may transit from an idle mode or an inactive mode to a connected mode through an RRC establishment procedure or an RRC resume procedure with a NR base station (gNB) 2*g*-10, in operation 2*g*-15. The base station 2*g*-10 may set a logged MDT operation for the UE 2*g*-05 by using a predefined RRC message, in operation 2*g*-20. Configuration information of logged MDT may be applied to the idle mode, to the inactive mode, or to both the idle mode and the inactive mode. The base station 2*g*-10 may indicate an RRC state for performing logged MDT with MDT configuration information. The MDT configuration information may include at least one condition for performing a logged MDT operation. When the UE 2*g*-05 receives the MDT configuration information, the UE 2*g*-05 may start a first timer. The base station 2*g*-10 may transit the connection mode of the UE 2*g*-05 to the idle mode or the inactive mode by using an RRCRelease message, in operation 2*g*-25. The MDT configuration information may be included in the RRCRelease message. By excluding transmitting a separate RRC message for providing MDT configuration information to the UE 2*g*-05, signaling overhead may be reduced.

According to an embodiment, when the UE 2*g*-05 being in the idle mode or the inactive mode meets a preset condition, the UE 2*g*-05 may perform a logged MDT operation one time. When the UE 2g-05 is in the idle mode (or inactive mode), the first timer is running, and the preset condition meets, the UE 2g-05 may perform the logged MDT operation one time, in operation 2g-30. Performing the logged MDT operation one time may mean collecting and storing a set of latest effective MDC measurement information. When transition to the connection mode again occurs although the first timer is running, the logged MDT operation may stop. A plurality of entering conditions may be set. When the first timer is expired, the logged MDT operation may also terminate, in operation 2g-35. Recorded MDT measurement information may be deleted from a memory of the UE 2g-05 when a predefined time elapses after the first timer is expired.

Figure 23:
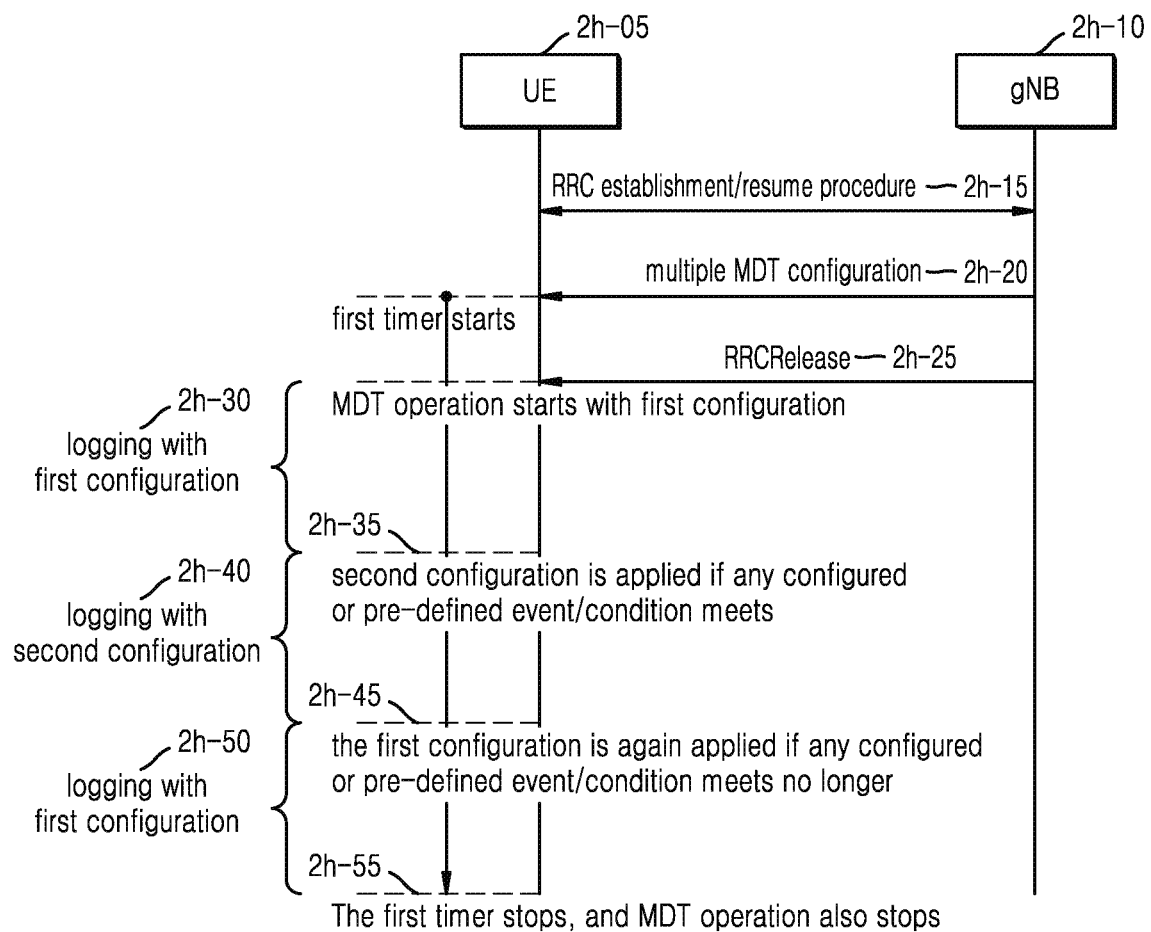
FIG. 23 is a diagram for describing a procedure of collecting and reporting cell measurement information based on a plurality of pieces of MDT configuration information, according to an embodiment.

FIG. 23 is a diagram for describing a procedure of collecting and reporting cell measurement information based on a plurality of pieces of MDT configuration information according to an embodiment.

A UE 2h-05 may transit from an idle mode or an inactive mode to a connection mode through an RRC establishment procedure or an RRC Resume procedure with a NR base station (gNB) 2h-10, in operation 2h-15. The base station 2h-10 may set a logged MDT operation for the UE 2h-05 by using a predefined RRC message, in operation 2h-20. Configuration information of logged MDT may be applied to the idle mode, to the inactive mode, or to both the idle mode and the inactive mode. The base station 2h-10 may indicate an RRC state of performing logged MDT with MDT configuration information. The MDT configuration information may include at least one condition for performing a logged MDT operation. When the UE 2h-05 receives the MDT configuration information, the UE 2h-05 may start a first timer. The base station 2h-10 may transit the connection mode of the UE 2h-05 to the idle mode or the inactive mode by using an RRCRelease message, in operation 2h-25. The MDT configuration information may be included in the RRCRelease message. By excluding transmitting a separate RRC message for providing MDT configuration information to the UE 2h-05, signaling overhead may be reduced.

According to an embodiment, the base station 2h-10 may provide a plurality of pieces of configuration information required for performing a logged MDT operation. In this case, when the UE 2h-05 being in the idle mode or the inactive mode meets one of one or more preset conditions, the UE 2h-05 may apply configuration information corresponding to the condition to perform a logged MDT operation.

A set of pieces of configuration information for the logged MDT operation may be configured with the following information.
  traceReference: Trace Reference
  traceRecordingSessionRef: Trace Recording Session Reference
  tce-id: IP address of TCE server
  absoluteTimeInfo: absolute time information
  areaConfiguration: region information in unit of a cell, a cell group, or a tracking area capable of performing a logged MDT operation
  loggingDuration: first timer value
  loggingInterval: logging interval
  plmn-IdentityList: ID (index) information of PLMNs capable of performing a logged MDT operation and reporting recorded information.

According to an embodiment, when a specific condition meets, another loggingInterval value may be applied to perform a logged MDT operation.

When the UE 2h-05 transits to the idle mode (or inactive mode), the UE 2h-05 may perform a logged MDT operation by using configuration information (first configuration information) considered as a default among a plurality of pieces of configuration information, in operation 2h-25. While a specific preset condition is satisfied in operation 2h-35 while the UE 2h-05 is performing the logged MDT operation by using the first configuration information in operation 2h-30, the UE 1h-05 may perform a logged MDT operation by using second configuration information, in operation 2h-40. For example, when the specific preset condition is that signal intensity of a serving cell is lower than or equal to predefined intensity and the second configuration information indicates a shorter logging interval, this may mean recording MDT measurement information at shorter intervals in a region where signal quality is poor. Accordingly, more measurement information may be provided to improve a region where signal quality is poor. When the condition does not meet in operation 2h-45, the UE 1h-05 may perform the logged MDT operation by again using the first configuration information, in operation 2h-50. According to an embodiment, the specific preset condition may be applied to both an entering condition and a leaving condition. Also, a condition for starting a logged MDT operation and a condition for stopping a logged MDT operation may be provided separately. Also, a plurality of conditions may be set. When the first timer is expired, the logged MDT operation may also terminate (2h-55). Recorded MDT measurement information may be deleted from a memory of the UE 1h-05 when a predefined time elapses after the first timer is expired.

The conditions mentioned in the above-described embodiments may include the following conditions.
  case in which signal intensity or quality of a current serving cell is lower than or equal to a specific threshold value
  case in which cell reselection between two cells occurs a specific number of times or more for a specific time interval In these cases, the following information may be additionally recorded.
  # of consecutive reselections
  Measured result right before cell reselection is executed
  Time when reselection is executed
  Location where reselection is executed
  if out-of-service area (OOS) is sensed (i.e. camped on any cell state or Any Cell Selection state)

In this case, the following information may be additionally recorded.
  Time duration when UE stays in camped on any cell state
  Time duration when UE stays in Any Cell Selection state
  Location info and measurement result when Any Cell Selection state starts
  Time info when Any Cell Selection state starts
  Location info and measurement result when UE come back to camped normally state
  Time info when UE come back to camped normally state
  when cell reselection between a non-NR cell and a NR cell occurs In this case, the following information may be additionally recorded.
  Location info and measurement result when inter-RAT cell reselection occurs
  Time info when inter-RAT cell reselection occurs FIG. 24 is a block diagram illustrating a structure of a UE according to an embodiment.

Figure 24:
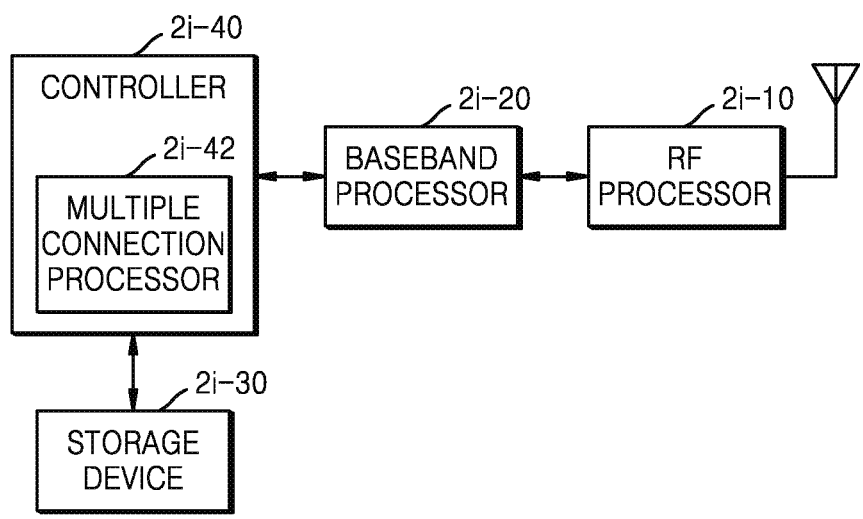
FIG. 24 is a block diagram illustrating a structure of a UE according to an embodiment.

Referring to FIG. 24, the UE may include a radio frequency (RF) processor 2*i*-10, a baseband processor 2*i*-20, a storage device 2*i*-30, and a controller 2*i*-40.

The RF processor 2*i*-10 may perform a function for transmitting/receiving signals through a wireless channel, such as band conversion, amplification, etc. of the signals. That is, the RF processor 2*i*-10 may up-convert a baseband signal provided from the baseband processor 2*i*-20 into an RF band signal, transmit the RF band signal through an antenna, and down-convert an RF band signal received through the antenna into a baseband signal. For example, the RF processor 2*i*-10 may include a transmitter filter, a receiver filter, an amplifier, a mixer, an oscillator, a digital to analog convertor (DAC), an analog to digital convertor (ADC), etc. In FIG. 20, a single antenna is shown, however, the UE may include a plurality of antennas. Also, the RF processor 2*i*-10 may include a plurality of RF chains. Furthermore, the RF processor 2*i*-10 may perform beamforming. For beamforming, the RF processor 2*i*-10 may adjust phases and magnitudes of signals that are transmitted/received through a plurality of antennas or antenna elements. Also, the RF processor 2*i*-10 may perform MIMO, and receive several layers when performing a MIMO operation.

The baseband processor 2*i*-20 may perform a function of conversion between a baseband signal and a bit string according to a physical layer specification of a system. For example, upon data transmission, the baseband processor 2*i*-20 may encode and modulate a transmission bit string to generate complex symbols. Also, upon data reception, the baseband processor 2*i*-20 may demodulate and decode a baseband signal provided from the RF processor 2*i*-10 to restore a reception bit string. For example, according to an OFDM method, upon data transmission, the baseband processor 2*i*-20 may encode and modulate a transmission bit string to generate complex symbols, map the complex symbols to subcarriers, and then configure OFDM symbols through an IFFT operation and CP insertion. Also, upon data reception, the baseband processor 2*i*-20 may segment a baseband signal provided from the RF processor 2*i*-10 in unit of OFDM symbols, restore signals mapped to subcarriers through a FFT operation, and then restore a reception bit string through demodulation and decoding.

The baseband processor 2*i*-20 and the RF processor 2*i*-10 may transmit and receive signals as described above. Accordingly, the baseband processor 2*i*-20 and the RF processor 2*i*-10 may be referred to as a transmitter, a receiver, a transceiver, or a communicator. Furthermore, at least one of the baseband processor 2*i*-20 and the RF processor 2*i*-10 may include a plurality of communication modules to support a plurality of different radio access technologies. Also, at least one of the baseband processor 2*i*-20 and the RF processor 2*i*-10 may include different communication modules to process signals of different frequency bands. For example, the different radio access technologies may include a wireless local area network (WLAN) (for example, IEEE 802.11), a cellular network (for example, LTE), etc. Also, the different frequency bands may include a super high frequency (SHF) (for example, 2.NRHz, NRhz) band and a millimeter (mm) wave (for example, 60 GHz) band.

The storage device 2*i*-30 may store data, such as a basic program, an application program, setting information, etc., for operations of the UE. Also, the storage device 2*i*-30 may provide the stored data according to a request from the controller 2*i*-40.

The controller 2*i*-40 may control overall operations of the UE. For example, the controller 2*i*-40 may transmit and receive signals through the baseband processor 2*i*-20 and the RF processor 2*i*-10. Also, the controller 2*i*-40 may record data in the storage device 2*i*-30 and read data from the storage device 2*i*-30. For this, the controller 2*i*-40 may include at least one processor. For example, the controller 2*i*-40 may include a communication processor (CP) that performs a control for communication and an application processor (AP) that controls an upper layer such as an application program.

Figure 25:
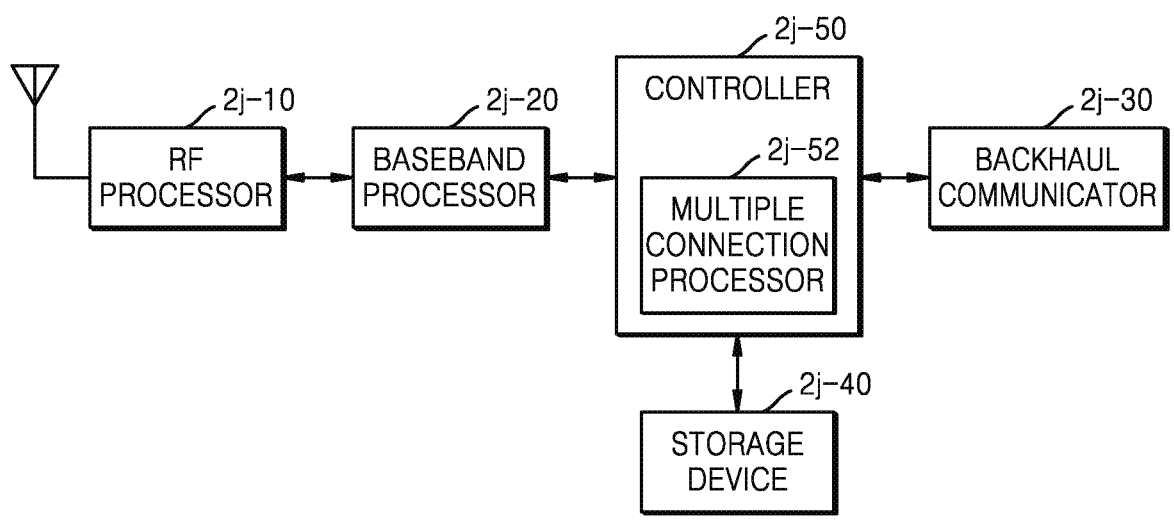
FIG. 25 is a block diagram illustrating a structure of a base station according to an embodiment.

FIG. 25 is a block diagram illustrating a structure of a base station according to an embodiment.

Referring to FIG. 25, the base station may include a RF processor 2*j*-10, a baseband processor 2*j*-20, a backhaul communicator 2*j*-30, a storage device 2*j*-40, and a controller 2*j*-50.

The RF processor 2*j*-10 may perform a function for transmitting and receiving signals through a wireless channel, such as band conversion, amplification, etc. of signals. That is, the RF processor 2*j*-10 may up-convert a baseband signal provided from the baseband processor 2*j*-20 into a RF band signal, transmit the RF band signal through an antenna, and down-convert an RF band signal received through the antenna into a baseband signal. For example, the RF processor 2*j*-10 may include a transmission filter, a reception filter, an amplifier, a mixer, an oscillator, a DAC, an ADC, etc. In FIG. 25, a single antenna is shown, however, the base station may include a plurality of antennas. Also, the RF processor 2*j*-10 may include a plurality of RF chains. Furthermore, the RF processor 2*j*-10 may perform beamforming. For beamforming, the RF processor 2*j*-10 may adjust phases and magnitudes of signals that are transmitted/received through the plurality of antennas or antenna elements. The RF processor 2*j*-10 may perform a downlink MIMO operation by transmitting one or more layers.

The baseband processor 2*j*-20 may perform a function of conversion between baseband signals and bit strings according to a physical layer specification. For example, upon data transmission, the baseband processor 2*j*-20 may encode and modulate a transmission bit string to generate complex symbols. Also, upon data reception, the baseband processor 2*j*-20 may demodulate and decode a baseband signal provided from the RF processor 2*j*-10 to restore a reception bit string. For example, according to an OFDM method, upon data transmission, the baseband processor 2*j*-20 may encode and modulate a transmission bit string to generate complex symbols, map the complex symbols to subcarriers, and then construct OFDM symbols through IFFT and CP insertion. Also, upon data reception, the baseband processor 2*j*-20 may segment a baseband signal provided from the RF processor 2*j*-10 in units of OFDM symbols, restore signals mapped to subcarriers through FFT, and then restore a reception bit string through demodulation and decoding. The baseband processor 2*i*-20 and the RF processor 2*j*-10 may transmit and receive signals as described above. Accordingly, the baseband processor 2*j*-20 and the RF processor 2*j*-10 are also referred to as a transmitter, a receiver, a transceiver, or a wireless communicator.

The backhaul communicator 2*j*-30 may provide an interface for communicating with other nodes in a network. That is, the backhaul communicator 2*j*-30 may convert a bit string that is transmitted from a master base station to another node (for example, a secondary base station, a core network, etc.) into a physical signal, and convert a physical signal received from another node into a bit string.

The storage device 2*j*-40 may store data, such as basic programs, application programs, and configuration information, for operations of the master base station. Particularly, the storage device 2j-40 may store information about a bearer assigned to a UE connected to the base station, a measurement result reported from the connected UE, etc. Also, the storage device 2j-40 may store information that is used as a determination criterion about whether to provide multiple connections to the UE or whether to release multiple connections to the UE. Also, the storage device 2j-40 may provide the stored data according to a request from the controller 2j-50.

The controller 2j-50 may control overall operations of the master base station. For example, the controller 2j-50 may transmit and receive signals through the baseband processor 2j-20 and the RF processor 2j-10 or through the backhaul communicator 2j-30. Also, the controller 2j-50 may write data in the storage device 2j-40 or read data from the storage device 2j-40. To write or read data, the controller 2i-50 may include at least one processor.

The methods according to the embodiments of the disclosure described in claims or specification thereof may be implemented in hardware, software, or a combination of hardware and software.

When the methods are implemented in software, a computer-readable storage medium or a computer program product storing at least one program (software module) may be provided. The at least one program stored in the computer-readable storage medium or the computer program product may be configured for execution by at least one processor within an electronic device. The at least one program may include instructions that cause the electronic device to execute the methods according to the embodiments of the disclosure described in the claims or specification thereof.

The program (software module or software) may be stored in random access memory (RAM), a non-volatile memory including a flash memory, read only memory (ROM), an electrically erasable programmable ROM (EEPROM), a magnetic disc storage device, compact disc-ROM (CD-ROM), digital versatile discs (DVDs) or other types of optical storage devices, and a magnetic cassette. Alternatively, the program may be stored in a memory that is configured as a combination of some or all of the memories. A plurality of such memories may be included.

Furthermore, the program may be stored in an attachable storage device that may be accessed through communication networks such as the Internet, Intranet, a local area network (LAN), a wide LAN (WLAN), or a storage area network (SAN) or a communication network configured in a combination thereof. The storage device may access a device performing the embodiments of the disclosure through an external port. Further, a separate storage device on the communication network may also access the device performing the embodiments of the disclosure.

In the embodiments of the disclosure, a component included in the disclosure is expressed in a singular or plural form depending on the described embodiments of the disclosure. However, singular or plural expressions are selected to be suitable for the presented situations for convenience of description, and the disclosure is not limited to the singular or plural form. A component expressed in a plural form may be configured as a single component, or a component expressed in a singular form may be configured as a plurality of components.

Meanwhile, the embodiments of the disclosure disclosed in the present specification and the drawings are specific examples intended to easily describe the technical content of the disclosure and help understanding the disclosure, not intended to limit the scope of the disclosure. That is, it is apparent to those skilled in the art that other modified examples based on the technical spirit of the disclosure may be executed. Also, the embodiments may be combined and used as needed. For example, a part of an embodiment of the disclosure may be combined with a part of another embodiment of the disclosure. Also, the embodiments of the disclosure may be applied to other systems (for example, a LTE system, a 5G or NR system, etc.), and other modified examples based on the technical concept of the embodiments may also be executed.

The invention claimed is:

1. A method performed by a user equipment (UE) in a wireless communication system, the method comprising:
    receiving, from a base station, logged minimization of drive test (MDT) configuration information including a logging duration and an event for triggering a logging of measurement information;
    starting a timer with a timer value set to the logging duration;
    while the timer is running, in case that the event for triggering the logging is configured to an out-of-service area (OOS) and the UE is in any cell selection state, initiating the logging of the measurement information, based on the logged MDT configuration information, wherein the measurement information is logged only one time in the logging duration which is greater than 0, and wherein the UE is in a radio resource control (RRC) inactive mode; and
    transmitting, to the base station, information related to the measurement information.

2. The method of claim 1, wherein the OOS is associated with the UE in the any cell selection state.

3. The method of claim 1, further comprising:
    in case that the event for triggering the logging is associated with a measurement result of a serving cell and the measurement result is less than a threshold, initiating the logging the measurement information, based on the logged MDT configuration information.

4. The method of claim 3, wherein in case that a logging interval is configured, the measurement information is logged periodically, based on the logging interval.

5. The method of claim 1, wherein the logged MDT configuration information further includes a trace reference, a trace recording session reference, internet protocol (IP) address of a trace collection entity (TCE) server and absolute time information.

6. A user equipment (UE) in a wireless communication system, the UE comprising:
    a transceiver; and
    at least one processor coupled with the transceiver and configured to:
        receive, from a base station, via the transceiver, logged minimization of drive test (MDT) configuration information including a logging duration and an event for triggering a logging of measurement information;
        start a timer with a timer value set to the logging duration;
        while the timer is running, in case that the event for triggering the logging is configured to an out-of-service area (OOS) and the UE is in any cell selection state, initiate the logging of the measurement information, based on the logged MDT configuration information, wherein the measurement information is logged only one time in the logging duration which is greater than 0, and wherein the UE is in a radio resource control (RRC) inactive mode; and transmit, to the base station via the transceiver, information related to the measurement information.

7. The UE of claim 6, wherein the OOS is associated with the UE in the any cell selection state.

8. The UE of claim 6, wherein the at least one processor is further configured to:
in case that the event for triggering the logging is associated with a measurement result of a serving cell and the measurement result is less than a threshold, initiating the logging of the measurement information, based on logged MDT configuration information.

9. The UE of claim 8, wherein in case that a logging interval is configured, the measurement information is logged periodically, based on the logging interval.

10. The UE of claim 6, wherein the logged MDT configuration information further includes a trace reference, a trace recording session reference, internet protocol (IP) address of trace collection entity (TCE) server and absolute time information.

\* \* \* \* \*